United States Patent
Omura et al.

(10) Patent No.: US 12,483,051 B2
(45) Date of Patent: Nov. 25, 2025

(54) CODE READING DEVICE AND CODE READING SYSTEM

(71) Applicant: KEYENCE CORPORATION, Osaka (JP)

(72) Inventors: Yuta Omura, Osaka (JP); Shinya Kajimoto, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 18/409,229

(22) Filed: Jan. 10, 2024

(65) Prior Publication Data

US 2024/0275189 A1    Aug. 15, 2024

(30) Foreign Application Priority Data

Feb. 10, 2023    (JP) .................................. 2023-019188

(51) Int. Cl.
*H02J 7/00*    (2006.01)
*G06K 7/10*    (2006.01)
*H02J 50/10*    (2016.01)

(52) U.S. Cl.
CPC ........ *H02J 7/0044* (2013.01); *G06K 7/10881* (2013.01); *H02J 50/10* (2016.02); *G06K 2007/10524* (2013.01)

(58) Field of Classification Search
CPC .... H02J 7/0044; H02J 50/10; G06K 7/10881; G06K 2007/10524; G06K 7/10
See application file for complete search history.

(56) References Cited

U.S. PATENT DOCUMENTS

| | | | |
|---|---|---|---|
| 5,070,293 A * | 12/1991 | Ishii | H02J 50/10 320/108 |
| 7,537,164 B2 | 5/2009 | Joseph et al. | |
| 7,852,519 B2 | 12/2010 | Meier et al. | |
| 11,437,831 B2 * | 9/2022 | Di Bari | H02J 7/0044 |
| 2006/0006231 A1 | 1/2006 | Anson et al. | |

(Continued)

FOREIGN PATENT DOCUMENTS

| | | | |
|---|---|---|---|
| CN | 210605727 U | * | 5/2020 |
| JP | 2006246566 A | * | 9/2006 |

OTHER PUBLICATIONS

CN 210605727U—A hand-held bar code scanner, 4 pages. (Year: 2024).*

(Continued)

*Primary Examiner* — Tuyen K Vo
(74) *Attorney, Agent, or Firm* — WHDA, LLP

(57) ABSTRACT

A power receiving unit incorporating a power receiving coil is provided not on a head but on a front surface of a grip end so that an increase in size of the head due to the provision of the power receiving coil is avoided. In a horizontally installed form in which the code reading device is placed on a stand installed on a horizontal installation surface, the head and the power receiving unit are supported by the stand in the vertical direction. A code reading device can be stably supported by the stand by supporting the code reading device at two positions of the head and the power receiving unit. In addition, the power receiving unit comes close to the power transmitting unit of the stand from the upper side while being supported by the stand in this manner, so that the wireless charging can be executed.

14 Claims, 16 Drawing Sheets

(56) References Cited

U.S. PATENT DOCUMENTS

| | | | |
|---|---|---|---|
| 2011/0290889 A1* | 12/2011 | Tamburrini | G06K 7/109 |
| | | | 235/472.01 |
| 2018/0205249 A1* | 7/2018 | Colavito | H02J 7/0048 |
| 2019/0222044 A1* | 7/2019 | Liu | H02J 7/0044 |
| 2020/0257351 A1* | 8/2020 | Stanzani | G06K 7/10881 |
| 2021/0111580 A1 | 4/2021 | Barkan et al. | |
| 2021/0174040 A1* | 6/2021 | Mazzone | G06K 7/10881 |
| 2023/0216352 A1* | 7/2023 | Moschini | H02J 50/80 |
| | | | 320/108 |

OTHER PUBLICATIONS

JP2006246566A Portable Information Reading Device, 6 pages. (Year: 2025).*
Related co-pending: U.S. Appl. No. 18/409,028, filed Jan. 10, 2024, counterpart Japanese Patent Application No. 2023-019186.
Related co-pending: U.S. Appl. No. 18/409,075, filed Jan. 10, 2024, counterpart Japanese Patent Application No. 2023-019189.
Related co-pending: U.S. Appl. No. 18/409,115, filed Jan. 10, 2024, counterpart Japanese Patent Application No. 2023-019190.

* cited by examiner

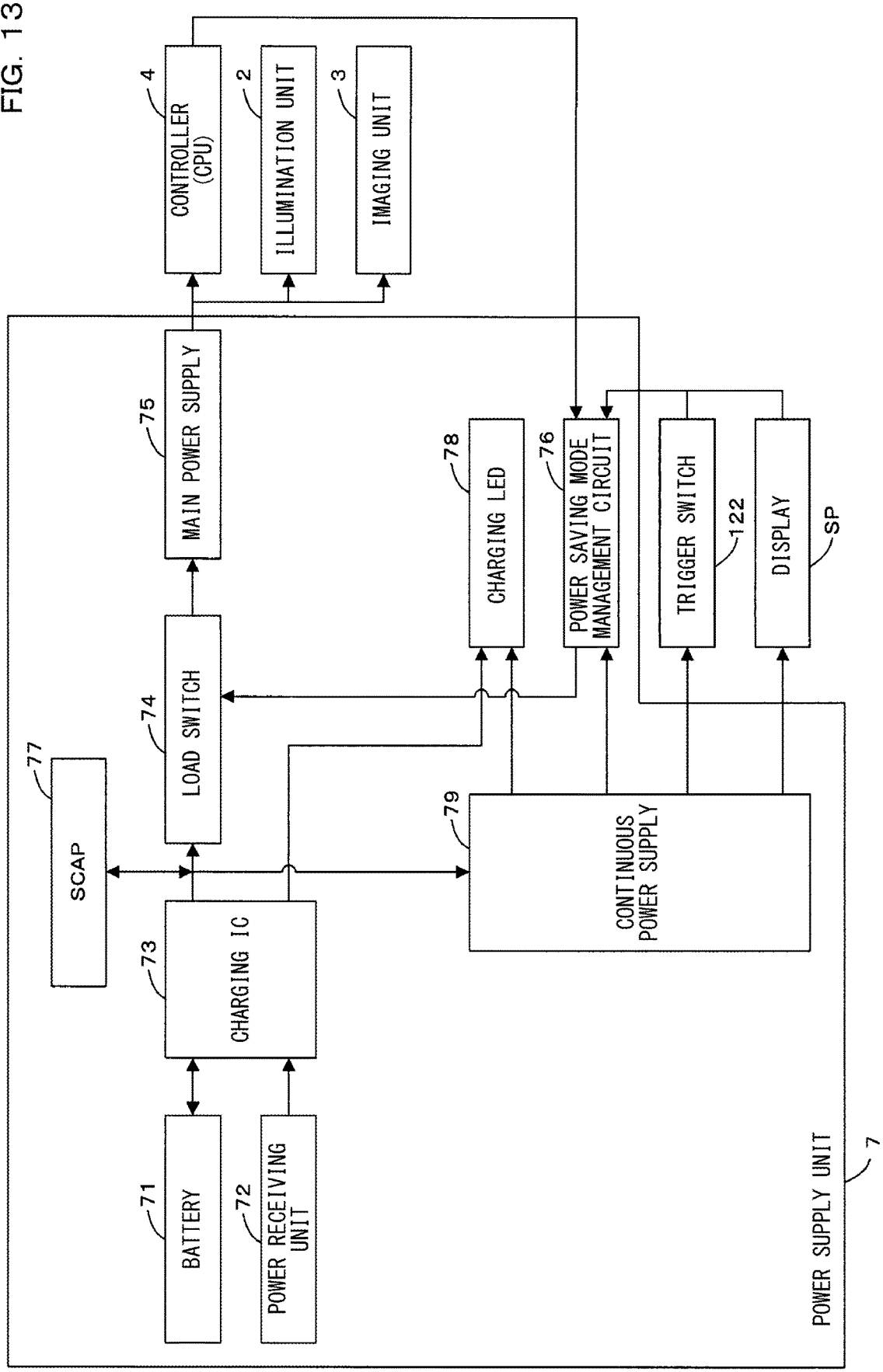

CODE READING DEVICE AND CODE READING SYSTEM

CROSS-REFERENCE TO RELATED APPLICATIONS

The present application claims foreign priority based on Japanese Patent Application No. 2023-019188, filed Feb. 10, 2023, the contents of which are incorporated herein by reference.

BACKGROUND OF THE INVENTION

1. Technical Field

The invention relates to a technique for performing wireless charging on a code reading device.

2. Description of the Related Art

US 2021/0111580 discloses a technique for performing wireless charging on a code reading device. That is, a power receiving coil is provided on one of a head and a foot at both ends of a handle of the code reading device.

In addition, a power transmitting coil is built in a stand of the code reading device so as to face the power receiving coil of the code reading device placed on the stand.

However, in an example in which the power receiving coil is provided in the head, a size of the head increases, which makes the balance of the code reading device poor. In addition, in an example in which the power receiving coil is provided in the foot, it is necessary to erect and support the code reading device while placing a bottom surface of the foot provided with the power receiving coil on the stand in order to cause the power receiving coil to face the power transmitting coil of the stand from the upper side, which makes the support of the code reading device unstable.

SUMMARY OF THE INVENTION

The invention has been made in view of the above problems, and an object thereof is to reduce a size of a head of a code reading device having a power receiving coil for wireless charging and to enable execution of the wireless charging of the code reading device while stably supporting the code reading device.

According to one embodiment of the invention, a code reading device is a code reading device that is wirelessly chargeable by a power transmitting coil of a stand, which has a power transmitting unit incorporating the power transmitting coil and is installable on a horizontal plane, and includes: a head incorporating a light receiving sensor; a grip extending from the head in an axial direction; a grip end provided at an end portion of the grip on a side opposite to the head in the axial direction; and a power storage unit. The grip includes a trigger switch provided between the head and the grip end on a detection region side of the light receiving sensor and configured to start detection by the light receiving sensor. The grip end includes a grip end bottom surface intersecting the axial direction, a grip end front surface extending from the grip end bottom surface toward the trigger switch, and a power receiving unit that incorporates a power receiving coil and is provided on the grip end front surface. In a first form in which the code reading device is placed on the stand installed on a horizontal plane, the head and the power receiving unit are supported by the stand in a vertical direction, the power receiving unit comes close to the power transmitting unit from an upper side in the vertical direction, the power receiving coil faces the power transmitting coil, and wireless charging is executed from the power transmitting coil to the power storage unit via the power receiving coil.

According to one embodiment of the invention, a code reading system is a code reading system including: a code reading device that includes a head incorporating a light receiving sensor, a grip extending from the head in an axial direction, and a power storage unit; and a stand that includes a power transmitting unit incorporating a power transmitting coil and is installable on a horizontal plane. The code reading device includes a grip end provided at an end portion of the grip on a side opposite to the head in the axial direction. The grip includes a trigger switch provided between the head and the grip end on a detection region side of the light receiving sensor and configured to start detection by the light receiving sensor. The grip end includes a grip end bottom surface intersecting the axial direction, a grip end front surface extending from the grip end bottom surface toward the trigger switch, and a power receiving unit that incorporates a power receiving coil and is provided on the grip end front surface. In a first form in which the code reading device is placed on the stand installed on the horizontal plane, the head and the power receiving unit are supported by the stand in a vertical direction, the power receiving unit comes close to the power transmitting unit from an upper side in the vertical direction, the power receiving coil faces the power transmitting coil, and wireless charging is executed from the power transmitting coil to the power storage unit via the power receiving coil.

In the invention (the code reading device and the code reading system) configured as described above, the power receiving unit incorporating the power receiving coil is provided not on the head but on the grip end front surface, thereby avoiding an increase in size of the head due to the provision of the power receiving coil. In addition, the head and the power receiving unit are supported by the stand in the vertical direction in the first form in which the code reading device is placed on the stand installed on the horizontal plane. That is, the code reading device can be stably supported by the stand by supporting the code reading device at two positions of the head and the power receiving unit. In addition, the power receiving unit comes close to the power transmitting unit of the stand from the upper side while being supported by the stand in this manner, so that the wireless charging can be executed. As a result, it is possible to reduce the size of the head of the code reading device including the power receiving coil for the wireless charging and to execute the wireless charging on the code reading device while stably supporting the code reading device.

In the invention configured as described above, it is possible to reduce the size of the head of the code reading device having the power receiving coil for the wireless charging and to execute the wireless charging of the code reading device while stably supporting the code reading device.

BRIEF DESCRIPTION OF THE DRAWINGS

FIG. 13 is a block diagram illustrating a configuration of a power supply unit of the code reading device.

DETAILED DESCRIPTION

Figure 1:
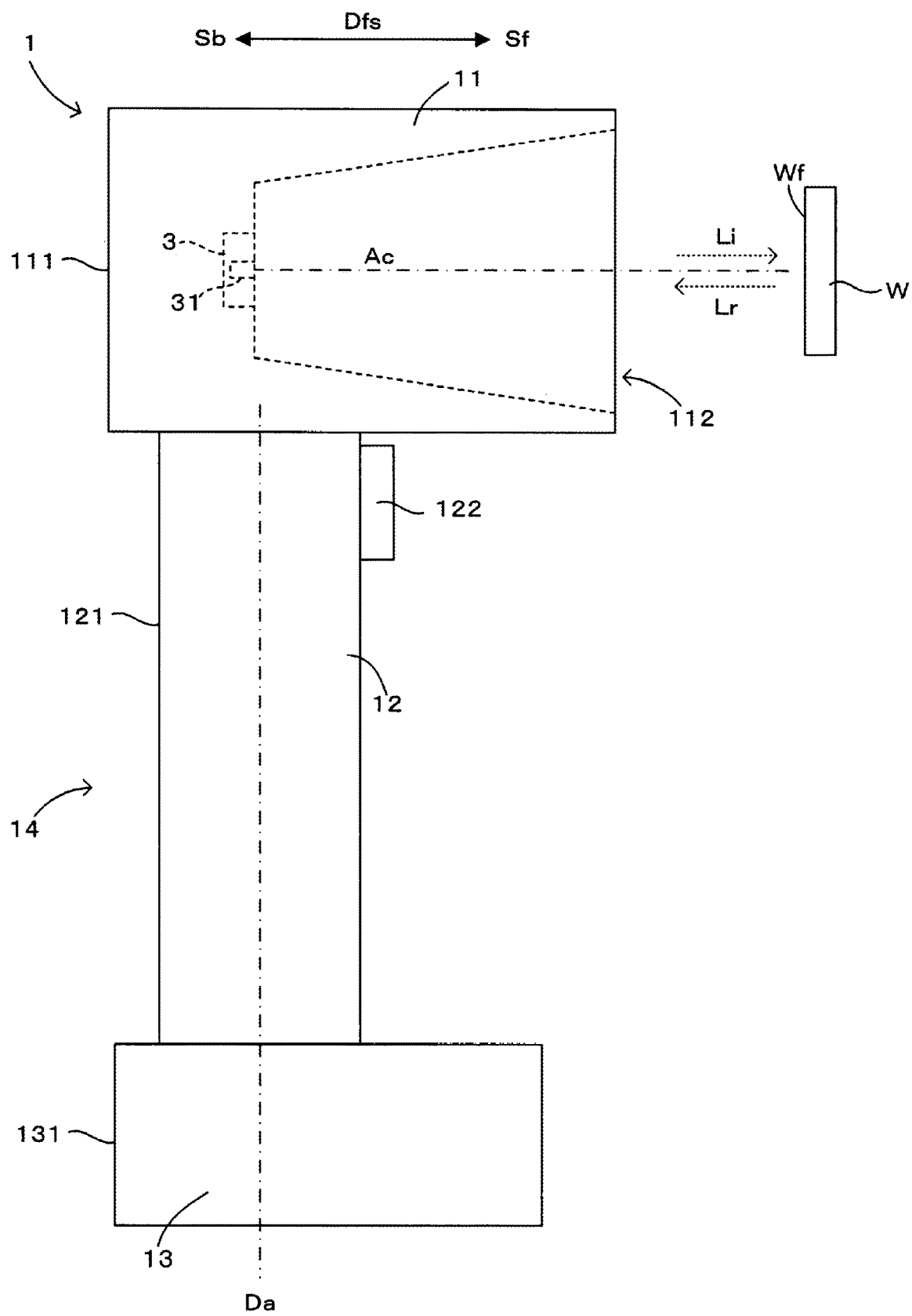
FIG. 1 is a side view schematically illustrating a configuration of a code reading device.
Figure 2:
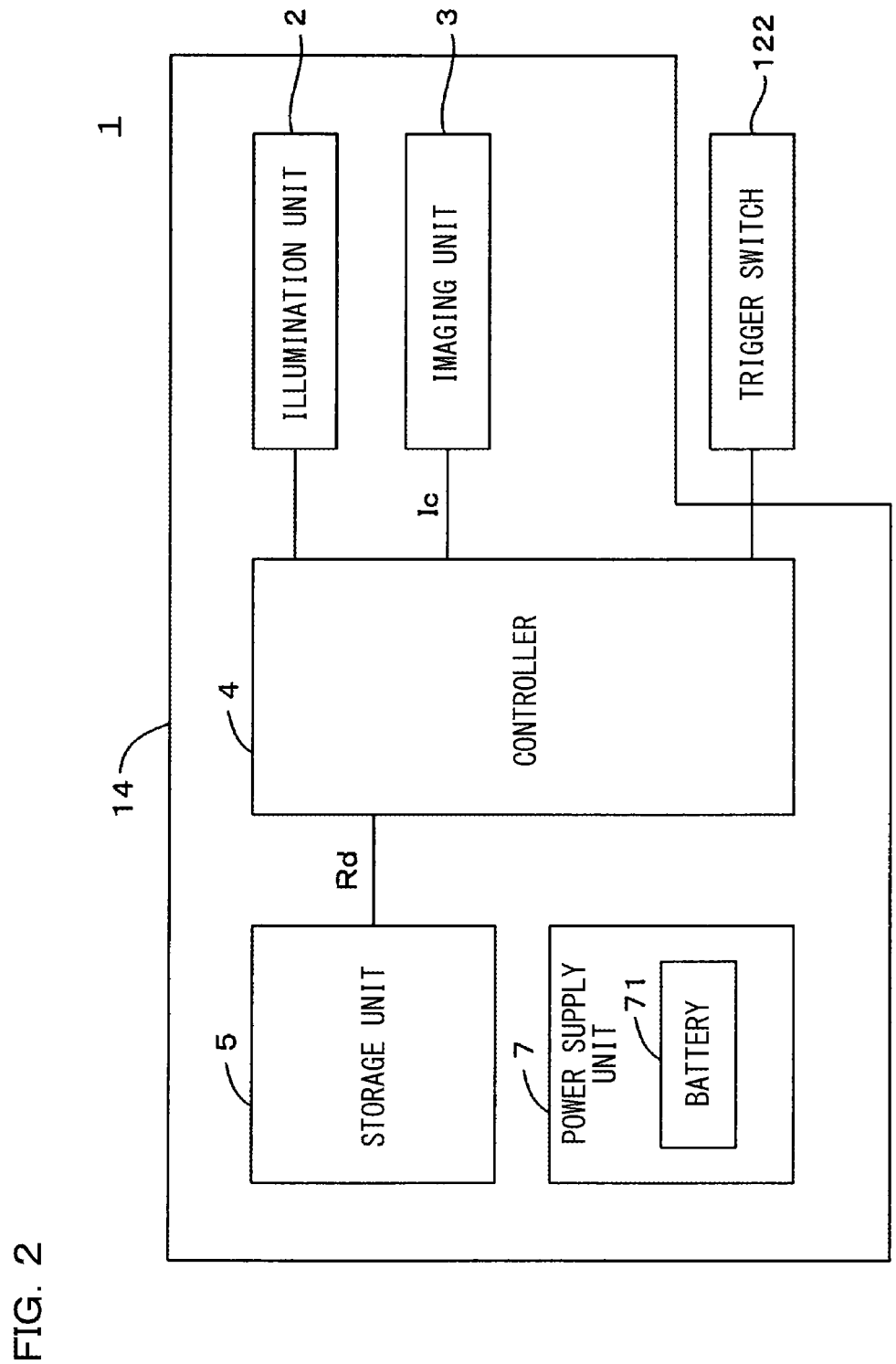
FIG. 2 is a block diagram schematically illustrating an electrical configuration of the code reading device of FIG. 1.

FIG. 1 is a side view schematically illustrating a configuration of a code reading device, and FIG. 2 is a block diagram schematically illustrating an electrical configuration of the code reading device of FIG. 1. Here, in a state where a code reading device 1 faces a surface Wf of a workpiece W in order to read a code attached to the surface Wf of the workpiece W by the code reading device 1, a front-rear direction Dfs is appropriately illustrated with a side closer to the workpiece W with respect to the code reading device 1 as a front side Sf and an opposite side of the workpiece W with respect to the code reading device 1 as a rear side Sb.

As illustrated in FIG. 1, the code reading device 1 includes a head 11, a grip 12, and a grip end 13. The grip 12 extends in an axial direction Da intersecting the front-rear direction Dfs between the head 11 and the grip end 13. In other words, the head 11 is provided at one end of the grip 12, and the grip end 13 is provided at the other end (end opposite to the one end) of the grip 12. The head 11 has a head body 111, the grip 12 has a grip body 121, the grip end 13 has a grip end body 131, and the head body 111, the grip body 121, and the grip end body 131 constitute a housing 14 that houses each unit incorporated in the code reading device 1.

The head body 111 of the head 11 has an opening 112 opened to the front side Sf, and the opening 112 faces the surface Wf of the workpiece W at the time of reading a cord. The head 11 includes an illumination unit 2 (FIG. 2) that irradiates the surface Wf of the workpiece W with illumination light Li and an imaging unit 3 that captures an image of the reflected light Lr from the surface Wf by a light receiving sensor 31 to generate a code image Ic, and the illumination unit 2 and the imaging unit 3 are housed in the head body 111. The light receiving sensor 31 is not particularly limited, and at least any of an area sensor, a line sensor, and a laser light receiving element can be used. The illumination light Li is emitted from the illumination unit 2 to the surface Wf of the workpiece W through the opening 112, the reflected light Lr is generated as the illumination light Li is reflected from the surface Wf of the workpiece W, and the reflected light Lr is incident on the light receiving sensor 31 of the imaging unit 3 from the surface Wf of the workpiece W through the opening 112.

The light receiving sensor 31 provided in the imaging unit 3 collects the reflected light Lr on an individual imaging element by a condenser lens which is an objective lens facing the surface Wf of the workpiece W. The individual imaging element receives the reflected light Lr collected by the condenser lens to generate the code image Ic. An optical axis of the light receiving sensor 31 (that is, an optical axis Ac of the condenser lens of the light receiving sensor 31) is parallel to the above-described front-rear direction Dfs.

The grip 12 includes a trigger switch 122 provided on the front side Sf of the grip body 121. The user can operate the trigger switch 122 with a finger while gripping the grip body 121 with a hand.

In addition, the code reading device 1 includes a controller 4 that controls each unit of the code reading device 1 and a storage unit 5 that stores data to be used in the code reading device 1 and generated data. The controller 4 and the storage unit 5 are housed in the housing 14. The controller 4 is a processor, that is, a central processing unit (CPU). The storage unit 5 is a storage device such as a read only memory (ROM) or a random access memory (RAM).

The controller 4 causes the illumination unit 2 to execute an illumination operation of irradiating the surface Wf of the workpiece W with the illumination light Li, and causes the imaging unit 3 to execute an imaging operation of receiving the reflected light Lr by the solid-state imaging element to generate the code image Ic. Furthermore, the controller 4 acquires the code image Ic generated by the imaging unit 3 and decodes the code image Ic. In this manner, code reading is executed by a series of operations such as the illumination operation by the illumination unit 2, the imaging operation by the imaging unit 3, and the decoding by the controller 4. For example, the controller 4 executes the code reading when sensing that the trigger switch 122 is operated by the user. A decoding result Rd which is a result of the code reading, that is, a result of the decoding of the code image Ic by the controller 4 is stored in the storage unit 5. The code reading device 1 transmits the decoding result Rd stored in the storage unit to an external host or the like by a communication scheme (not illustrated) such as a WLAN.

In addition, the code reading device 1 also includes a power supply unit 7 housed in the housing 14. The power supply unit 7 has a battery 71 that stores power, and the battery 71 supplies power to the illumination unit 2, the imaging unit 3, the controller 4, the storage unit 5, and the trigger switch 122. That is, each of the illumination unit 2, the imaging unit 3, the controller 4, the storage unit 5, and the trigger switch 122 is operated by the power supplied from the battery 71. That is, the battery 71 constitutes a power storage unit.

Figure 3:
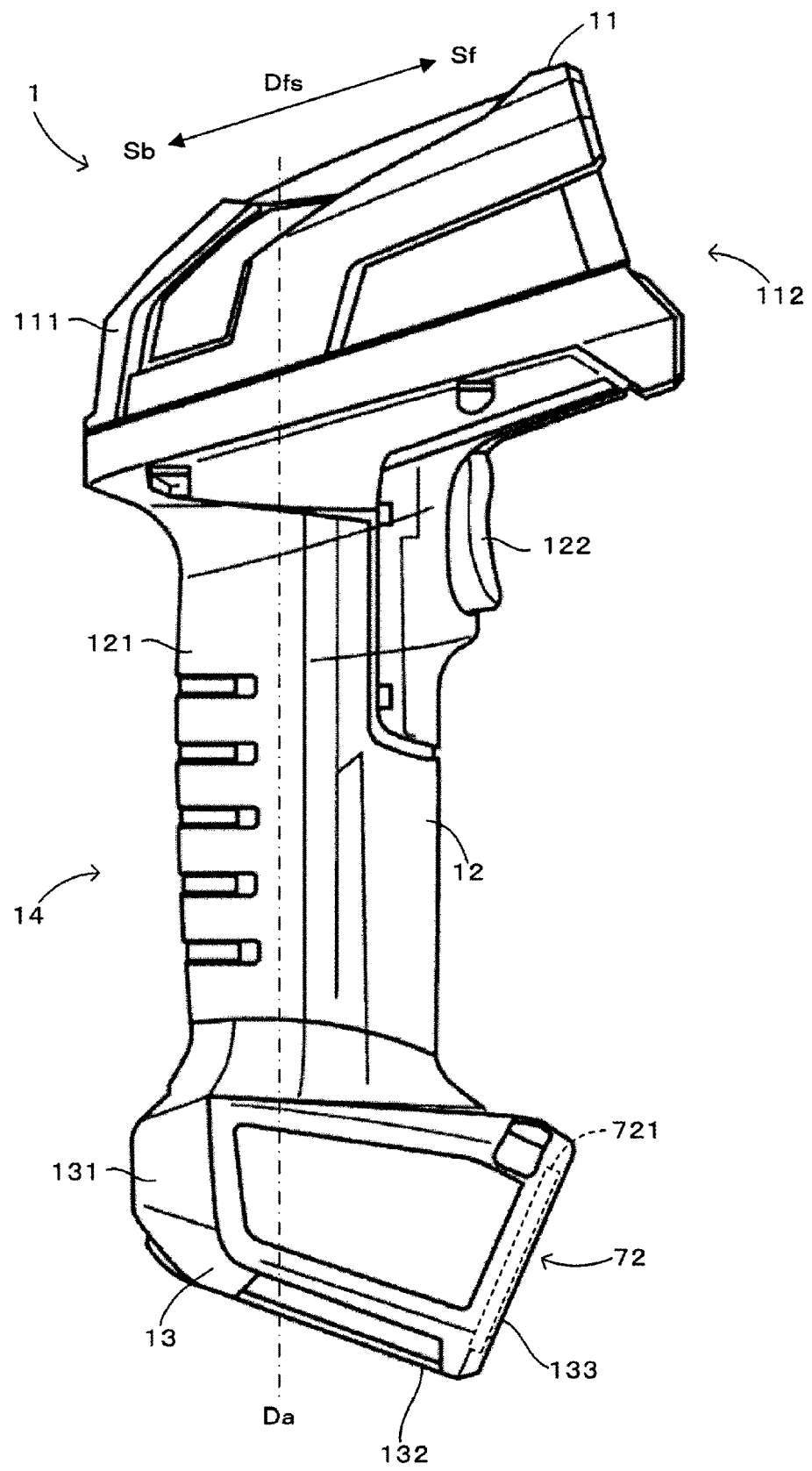
FIG. 3 is a side view illustrating an example of a specific exterior configuration of the code reading device.
Figure 4:
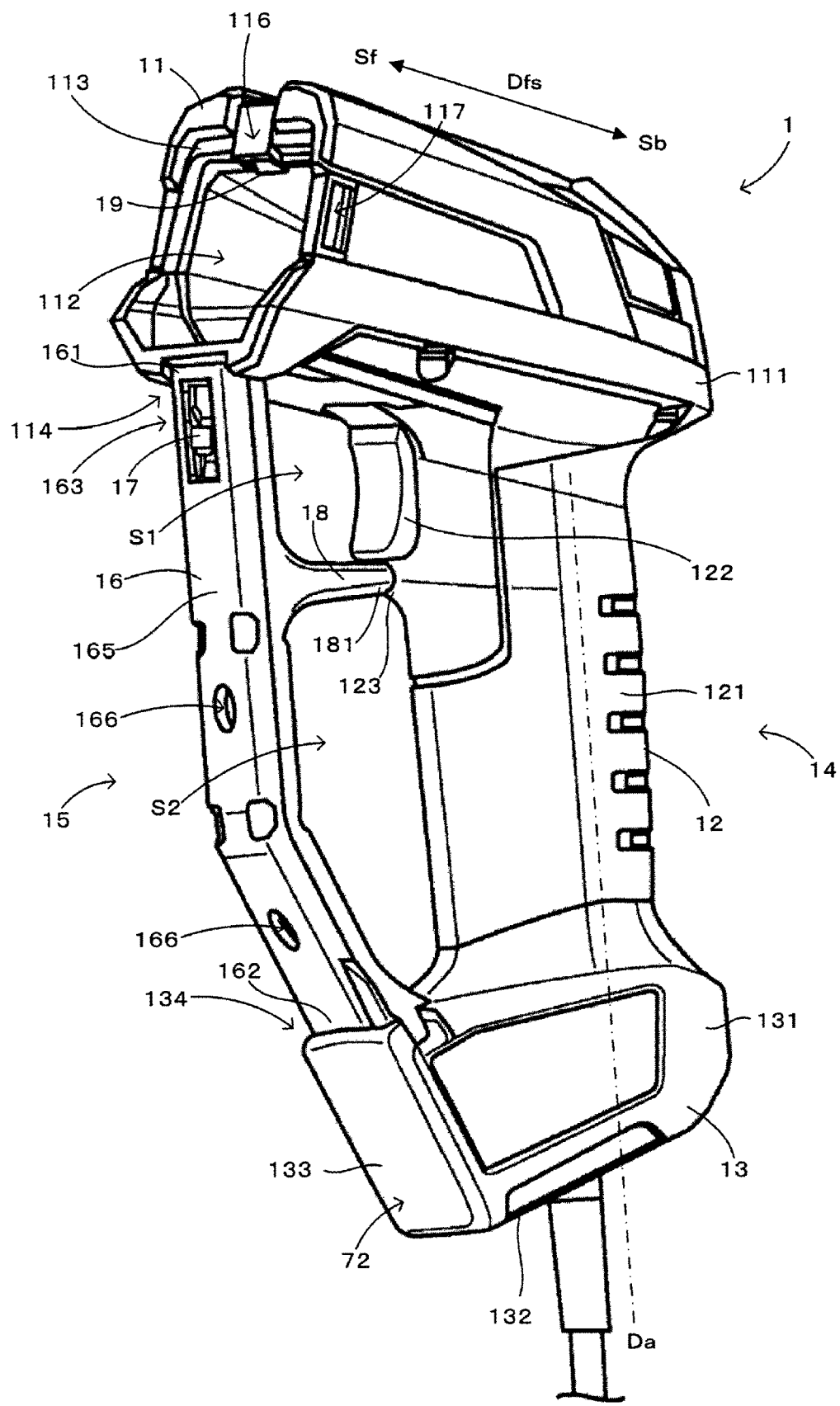
FIG. 4 is a perspective view illustrating the example of the specific exterior configuration of the code reading device.

FIG. 3 is a side view illustrating an example of a specific exterior configuration of the code reading device, and FIG. 4 is a perspective view illustrating the example of the specific exterior configuration of the code reading device. Note that a member housed in the housing 14 of the code reading device 1 is indicated by a broken line in FIG. 3.

As described above, the grip body 121 of the grip 12 extends in the axial direction Da between the head body 111 of the head 11 and the grip end body 131 of the grip end 13.

The grip body 121 is inclined with respect to the front-rear direction Dfs so as to be directed toward the rear side Sb as being away from the head body 111. That is, the grip body 121 is inclined to the rear side Sb with respect to the head body 111. The grip body 121 extends from an end portion of the head body 111 on the rear side Sb, and the head body 111 protrudes from the grip body 121 to the front side Sf (in other words, the trigger switch 122 side).

The grip end body 131 of the grip end 13 protrudes from the grip body 121 of the grip 12 toward the trigger switch 122. In addition, the trigger switch 122 arranged on the front side Sf of the grip body 121 is provided at an end portion of the grip body 121 on the head body 111 side.

In addition, the grip end body 131 also has a bottom surface 132 and a front surface 133. The bottom surface 132 is provided at an end of the grip end body 131 on a side opposite to the grip body 121 in the axial direction Da, and the front surface 133 extends from an end of the bottom surface 132 on the front side Sf to the trigger switch 122 side (in other words, the grip body 121 side) in the axial direction Da. The bottom surface 132 is provided to intersect the axial direction Da, and an end portion of the bottom surface 132 on the front surface 133 side is chamfered so as to bend toward the front surface 133. In addition, the front surface 133 is provided such that an end of the front surface 133 on the trigger switch 122 side is located on the front side Sf with respect to an end of the front surface 133 on a side opposite to the trigger switch 122.

A power receiving unit 72 of the power supply unit 7 is provided on the front surface 133. The power receiving unit 72 is housed in the grip end body 131. In addition, the power receiving unit 72 incorporates a power receiving coil 721 for receiving wirelessly transmitted power, and the power receiving coil 721 faces the front surface 133 from the inside of the grip end body 131. The power received by the power receiving coil 721 is transmitted from the power receiving coil 721 to the battery 71 and stored in the battery 71.

Figure 6:
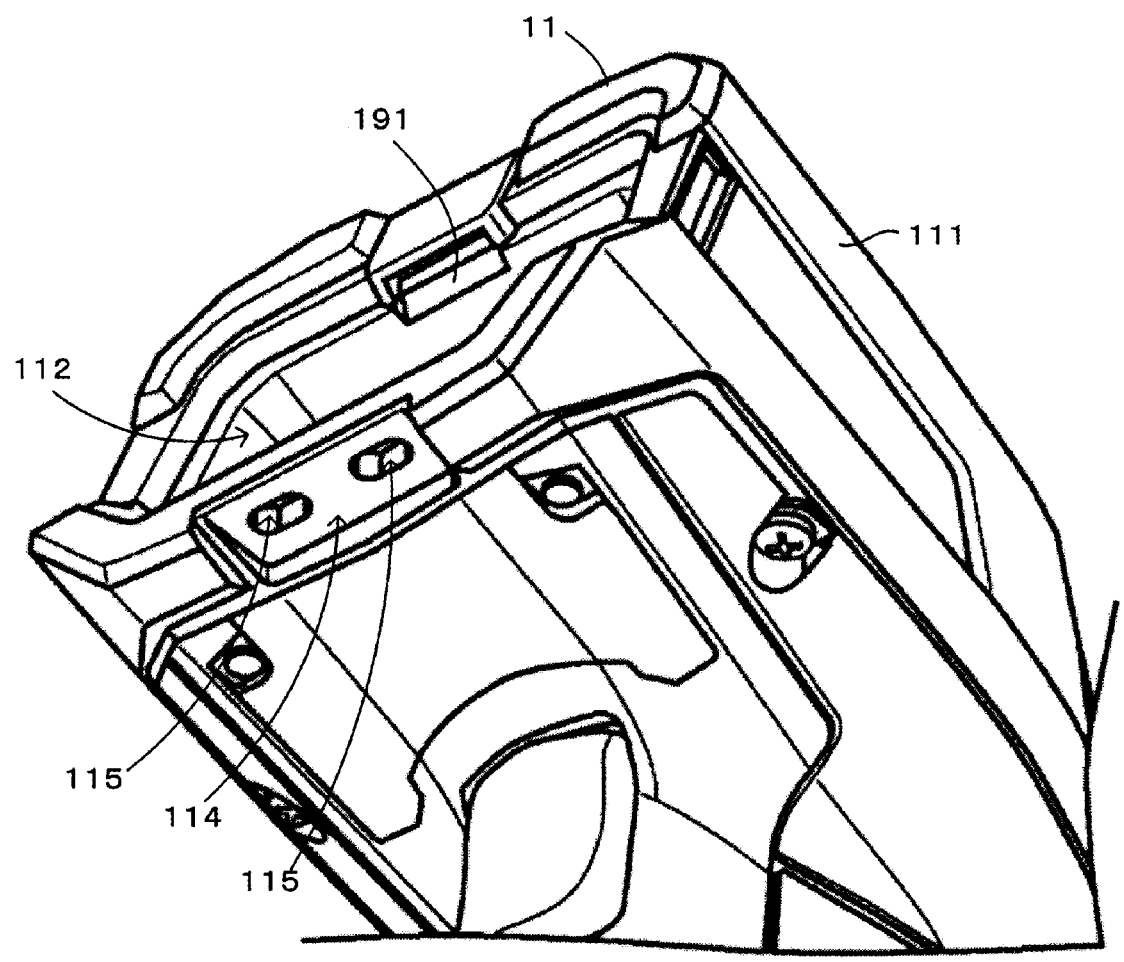
FIG. 6 is a perspective view illustrating a mounting portion of the finger bar provided in a head.
Figure 7:
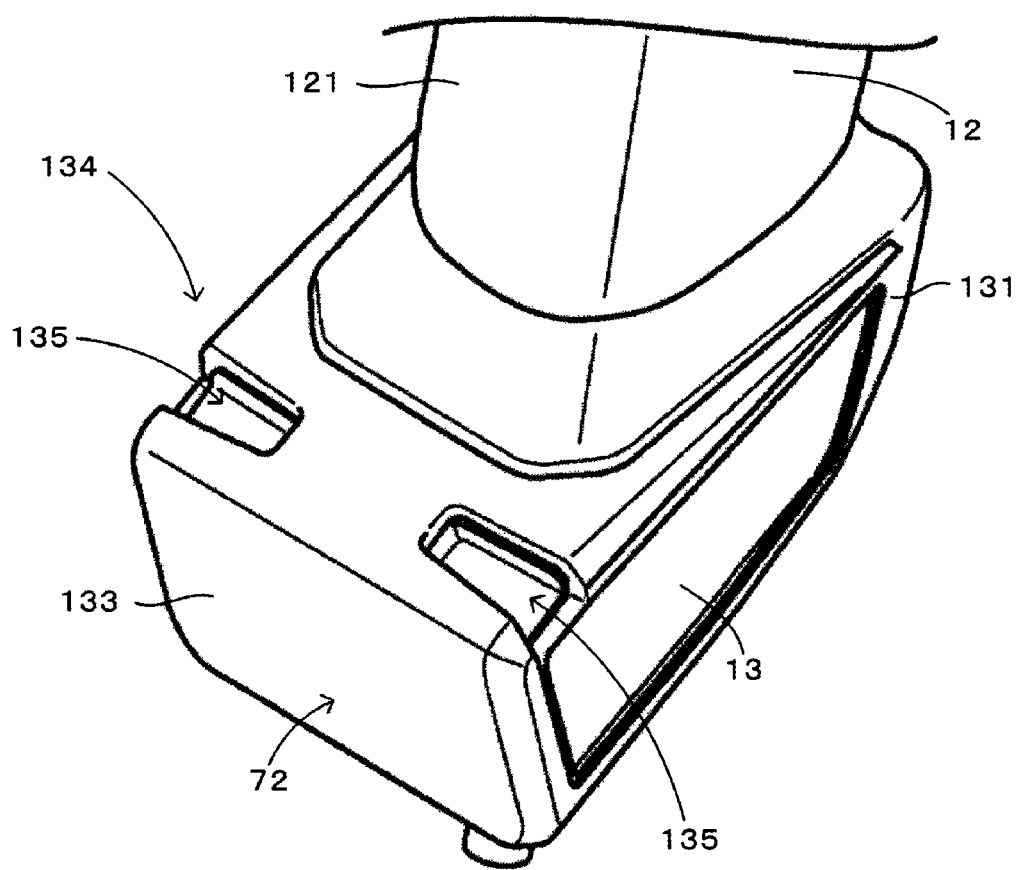
FIG. 7 is a perspective view illustrating a mounting portion of a finger bar provided in a grip end.

Furthermore, as illustrated in FIG. 4, the code reading device 1 includes a finger bar 15 detachably mounted to the housing 14. Next, a configuration of the finger bar 15 and a configuration of mounting the finger bar 15 to the housing 14 will be described with reference to FIGS. 5, 6, and 7 together. Here, FIG. 5 is a perspective view illustrating the configuration of the finger bar, FIG. 6 is a perspective view illustrating a mounting portion of the finger bar provided in the head, and FIG. 7 is a perspective view illustrating a mounting portion of the finger bar provided in the grip end.

The finger bar 15 includes a stay plate 16 extending from the grip end 13 to the head 11 on the front side Sf of the grip 12. The stay plate 16 is provided with an interval from the grip 12 in the front-rear direction Dfs. One end 161 of the stay plate 16 is supported by the head 11, and the other (opposite to the one) end 162 of the stay plate 16 is supported by the grip end 13. Specifically, the end 161 of the stay plate 16 is detachably mounted to a mounting portion 114 provided at an end portion of the head body 111 on the front side Sf, and the end 162 of the stay plate 16 is detachably mounted to the mounting portion 134 provided at an end portion of the grip end body 131 on the front side Sf.

As illustrated in FIG. 4, a slide claw 17 is built in an end portion of the stay plate 16 on the end 161 side. On the other hand, the stay plate 16 is provided with an opening 163 opened to the front side Sf, and the slide claw 17 is exposed to the front side Sf through the opening 163. Therefore, the user can operate the slide claw 17 through the opening 163. The slide claw 17 is slidable with respect to the stay plate 16 between a protruding position protruding from the end 161 of the stay plate 16 and a housing position accommodated in the inner side of the stay plate 16 from the end 161 of the stay plate 16. On the other hand, the mounting portion 114 of the head body 111 has a pair of engagement holes 115 as illustrated in FIG. 6. The pair of engagement holes 115 is opened on a surface of the head body 111 on the grip end body 131 side. The slide claw 17 facing the pair of engagement holes 115 from the grip end body 131 side is engaged with the pair of engagement holes 115 by being located at the protruding position, and is disengaged from the pair of engagement holes 115 by being located at the housing position.

Figure 5:
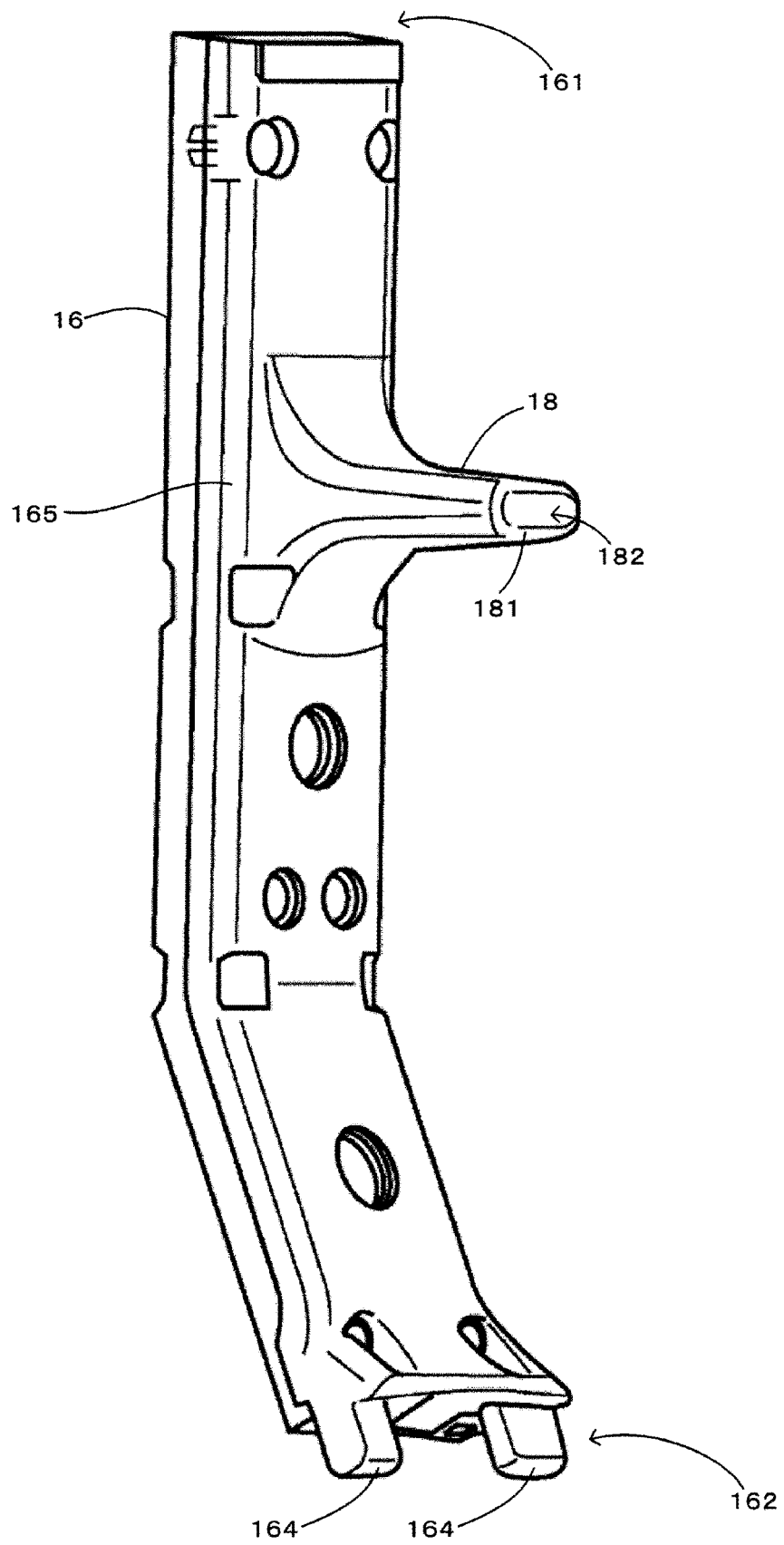
FIG. 5 is a perspective view illustrating a configuration of a finger bar.

As illustrated in FIG. 5, a pair of engagement projections 164 is provided at the end 162 of the stay plate 16. On the other hand, as illustrated in FIG. 7, the mounting portion 134 of the grip end body 131 has a pair of engagement holes 135. The pair of engagement holes 135 is opened on a surface of the grip end body 131 on the head body 111 side. The pair of engagement projections 164 of the stay plate 16 can be engaged with and disengaged from the pair of engagement holes 135 of the grip end body 131 from the grip end body 131 side.

In addition, the finger bar 15 has a support plate 18 extending from a middle portion 165 between the end 161 and the end 162 of the stay plate 16 to the rear side Sb (in other words, the grip body 121 side). As illustrated in FIG. 5, a fitting hole 182 is formed in an end 181 of the support plate 18 on the rear side Sb. A support portion 123 is provided on the front side Sf of the grip body 121, and the fitting hole 182 of the support plate 18 can be engaged with and disengaged from the support portion 123 of the grip body 121 from the front side Sf. The support portion 123 is provided on the grip end body 131 side with respect to the trigger switch 122.

Therefore, the user can mount the finger bar 15 to the housing 14 of the code reading device 1 by executing a procedure of engaging the pair of engagement projections 164 on the end 162 of the stay plate 16 with the pair of engagement holes 135 in the grip end body 131, causing the end 161 of the stay plate 16 to face the pair of engagement holes 115 of the head body 111 while locating the slide claw 17 at the housing position, fitting the fitting hole 182 of the support plate 18 is to the support portion 123, and sliding the slide claw 17 from the housing position to the protruding position.

As described above, the stay plate 16 is provided with the interval from the grip body 121 to the front side Sf, and spaces S1 and S2 are provided between the stay plate 16 and the grip body 121. Here, the space S1 is provided on the head body 111 side with respect to the support plate 18, and the space S2 is provided on the grip end body 131 side with respect to the support plate 18. Therefore, for example, the user can insert a middle finger, a ring finger, and a little finger into the space S2 while inserting an index finger into the space S1, thereby gripping the grip 12 with a hand. In addition, the trigger switch 122 faces the space S1 from the grip body 121 side, and the user can operate the trigger switch 122 with the index finger inserted in the space S1. The finger bar 15 allows the user to carry an object other than the code reading device 1 together while carrying the code reading device 1 by the hand, and thus, grasping performance of the code reading device 1 is improved.

Furthermore, the finger bar 15 has a plurality of attachment holes 166 penetrating the stay plate 16. Therefore, the finger bar 15 can be fastened to a support base by screwing screws inserted into the attachment holes 166 into the support base provided separately from the code reading device 1. That is, the user can use the code reading device 1 in a state where the code reading device 1 is fixed to the support base.

In addition, the head 11 of the code reading device 1 includes a hook portion 19 as illustrated in FIGS. 4 and 6. The hook portion 19 is provided to be hooked on a stand to be described later in a vertical posture in which the head 11 is located on the upper side of the grip end 13. The hook portion 19 is provided at the end portion of the head body 111 on the front side Sf side so as to protrude from a peripheral edge portion 113 of the opening 112 toward the opening 112. In particular, the hook portion 19 protrudes from the peripheral edge portion 113 to the opening 112 at a hook position 116 at an end (in other words, an upper end of the opening 112 in the vertical posture) of the opening 112 on a side opposite to the grip end body 131.

Note that the position of the hook portion 19 is not limited thereto, and the hook portion 19 is provided at a position different from the hook position 116 of the peripheral edge portion 113 of the opening 112 depending on a type of the code reading device 1. That is, in another type of code reading device 1, hook positions 117 are provided at end portions on the front side Sf on both side surfaces of the head body 111 of the head 11, and the hook portion 19 is provided so as to protrude laterally from the head body 111 at the respective hook positions 117.

Figure 8:
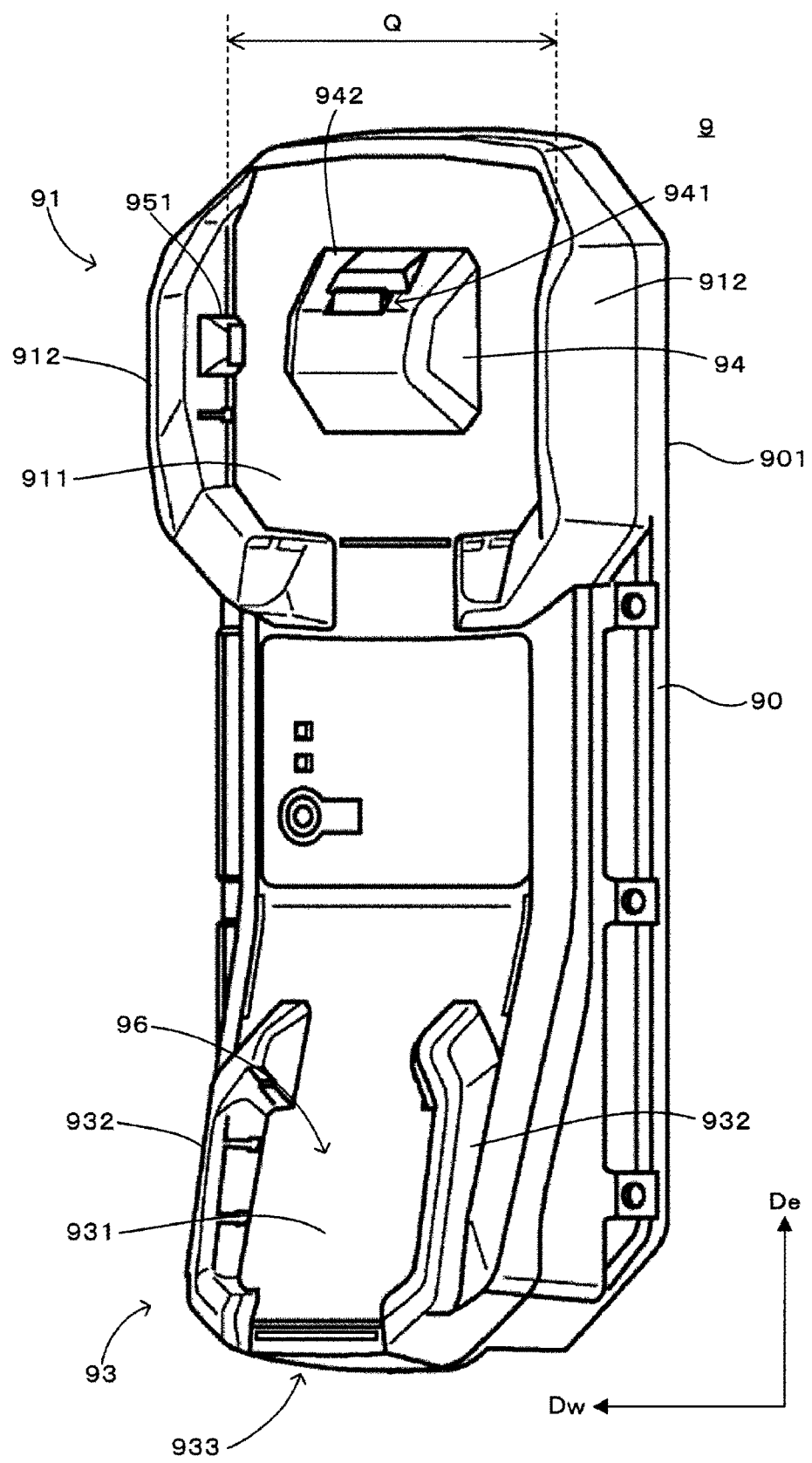
FIG. 8 is a perspective view illustrating a stand of the code reading device.
Figure 9:
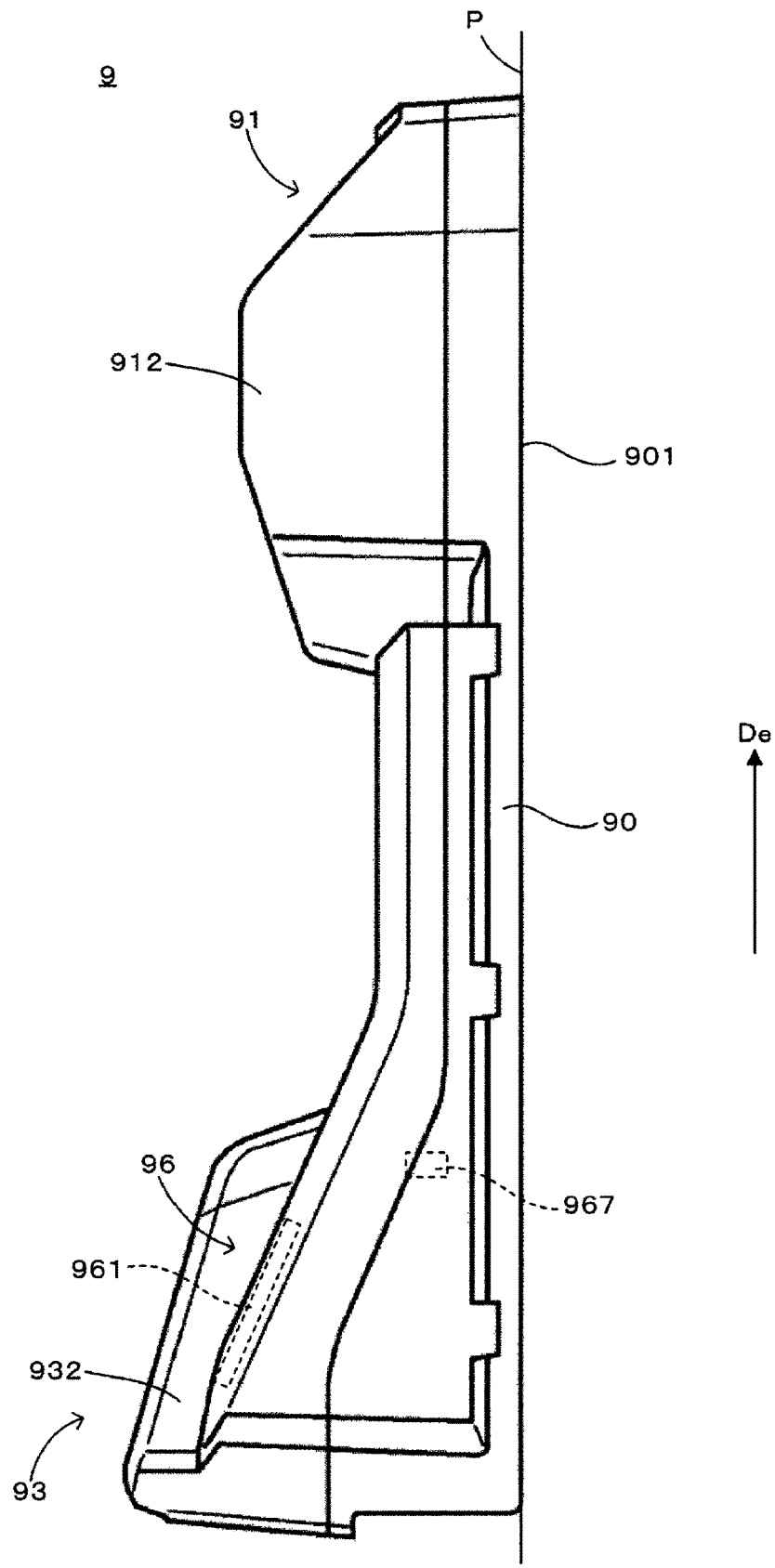
FIG. 9 is a side view illustrating the stand of the code reading device.

FIG. 8 is a perspective view illustrating the stand of the code reading device, and FIG. 9 is a side view illustrating the stand of the code reading device. Note that the members built in a stand 9 are indicated by broken lines in FIG. 9. In addition, a configuration of the stand 9 will be described here using a state in which the stand 9 is installed on an installation surface P that is flat.

The stand 9 has a base portion 90 extending in an extending direction De parallel to the installation surface P, and a contact surface 901 provided on the base portion 90 and parallel to the extending direction De is in contact with the installation surface P. In addition, the stand 9 also includes a head placement portion 91 and a grip end placement portion 93 which face the head 11 and the grip end 13 of the code reading device 1 placed on the stand 9, respectively. In other words, the head placement portion 91 is provided at one end portion of the base portion 90 in the extending direction De, and the grip end placement portion 93 is provided at the other (opposite to the one) end portion of the base portion 90 in the extending direction De.

The head placement portion 91 includes a head facing surface 911 facing an end on the front side Sf of the head 11 of the code reading device 1 placed on the stand 9 from the front side Sf, and a pair of wall portions 912 erected from both ends of the head facing surface 911 in the width direction Dw orthogonal to the extending direction De. The pair of wall portions 912 is erected from the head facing surface 911 on a side opposite to the installation surface P (in other words, a side opposite to the base portion 90). The pair of wall portions 912 is provided at an interval in the width direction Dw, and is arranged to be retracted in the width direction Dw from an entry path Q of the head 11 placed on the head placement portion 91 from a side opposite to the grip end placement portion 93 in the extending direction De. The pair of wall portions 912 positions the head 11 placed on the head placement portion 91 so as to face the head facing surface 911.

In addition, the stand 9 has a support block 94 protruding from the head facing surface 911 of the head placement portion 91 to the side opposite to the installation surface P. The support block 94 includes an engagement member 941 and a block body 942, and the engagement member 941 protrudes from the block body 942 to the side opposite to the grip end placement portion 93 in the extending direction De. The engagement member 941 is engaged with the hook portion 19 at the hook position 116 provided in the head 11 facing the head facing surface 911. More specifically, in the vertically installed form in which the stand 9 is installed on the installation surface P (a vertical plane) provided in the up-down direction of the paper surface, that is, the vertical direction as illustrated in FIGS. 8 and 9, the engagement member 941 is engaged with the hook portion 19 at the hook position 116 from the lower side, and the code reading device 1 is supported in the vertical direction against the gravity by the engagement member 941.

In addition, as described above, depending on the type of the code reading device 1, the hook portion 19 is provided at the hook positions 117 instead of the hook position 116. The stand 9 is also configured to support the hook portion 19 at the hook position 117 so as to be able to support the code reading device 1 regardless of the type of the code reading device 1. That is, a pair of engagement members 951 protruding inward is provided on inner walls of the pair of wall portions 912. Further, in the vertically installed form, each of the engagement members 951 is engaged with the hook portion 19 at each of the hook positions 117 from the lower side, and the code reading device 1 is supported in the vertical direction against the gravity by the engagement members 951.

The grip end placement portion 93 has a grip end facing surface 931 facing the front surface 133 of the grip end 13 of the code reading device 1 placed on the stand 9 from the front side Sf. The grip end facing surface 931 is inclined with respect to the installation surface P in a side view from the width direction Dw. More specifically, the grip end facing surface 931 is inclined so as to be away from the installation surface P as a distance from the head placement portion 91 increases in the extending direction De. In addition, the grip end placement portion 93 has a pair of wall portions 932 erected from both ends of the grip end facing surface 931 in the width direction Dw. The pair of wall portions 932 is erected from the grip end facing surface 931 on the side opposite to the installation surface P (in other words, the side opposite to the base portion 90), and positions the front surface 133 of the grip end 13 placed on the grip end placement portion 93 so as to face the grip end facing surface 931. The pair of wall portions 932 is provided at an interval in the width direction Dw, and a slit 933 is provided between the pair of wall portions 932 in the width direction Dw. That is, the slit 933 is a hole opened in a direction in which the grip end facing surface 931 is inclined with respect to the installation surface P.

Furthermore, the stand 9 includes a power transmitting unit 96 provided with respect to the head facing surface 911. The power transmitting unit 96 is housed in the grip end placement portion 93. In addition, the power transmitting unit 96 incorporates a power transmitting coil 961 for wirelessly transmitting power, and the power transmitting coil 961 faces the grip end facing surface 931 from the inside of the grip end placement portion 93.

The front surface 133 of the grip end 13 placed on the grip end placement portion 93 comes into contact with the grip end facing surface 931 of the grip end placement portion 93. As a result, the power transmitting coil 961 provided on the grip end facing surface 931 of the grip end placement portion 93 faces the power receiving coil 721 provided on the front surface 133 of the grip end 13, and power can be wirelessly supplied from the power transmitting coil 961 to the power receiving coil 721.

In addition, the stand 9 includes a cable connector portion 967 provided between the grip end placement portion 93 and the base portion 90. The cable connector portion 967 is provided with a cable insertion port opened to a side opposite to the head placement portion 91 in the extending direction De, and a cable inserted into the cable insertion port can be connected to the cable connector portion 967. Examples of such a cable include a universal serial bus (USB) cable and the like.

Figure 10:
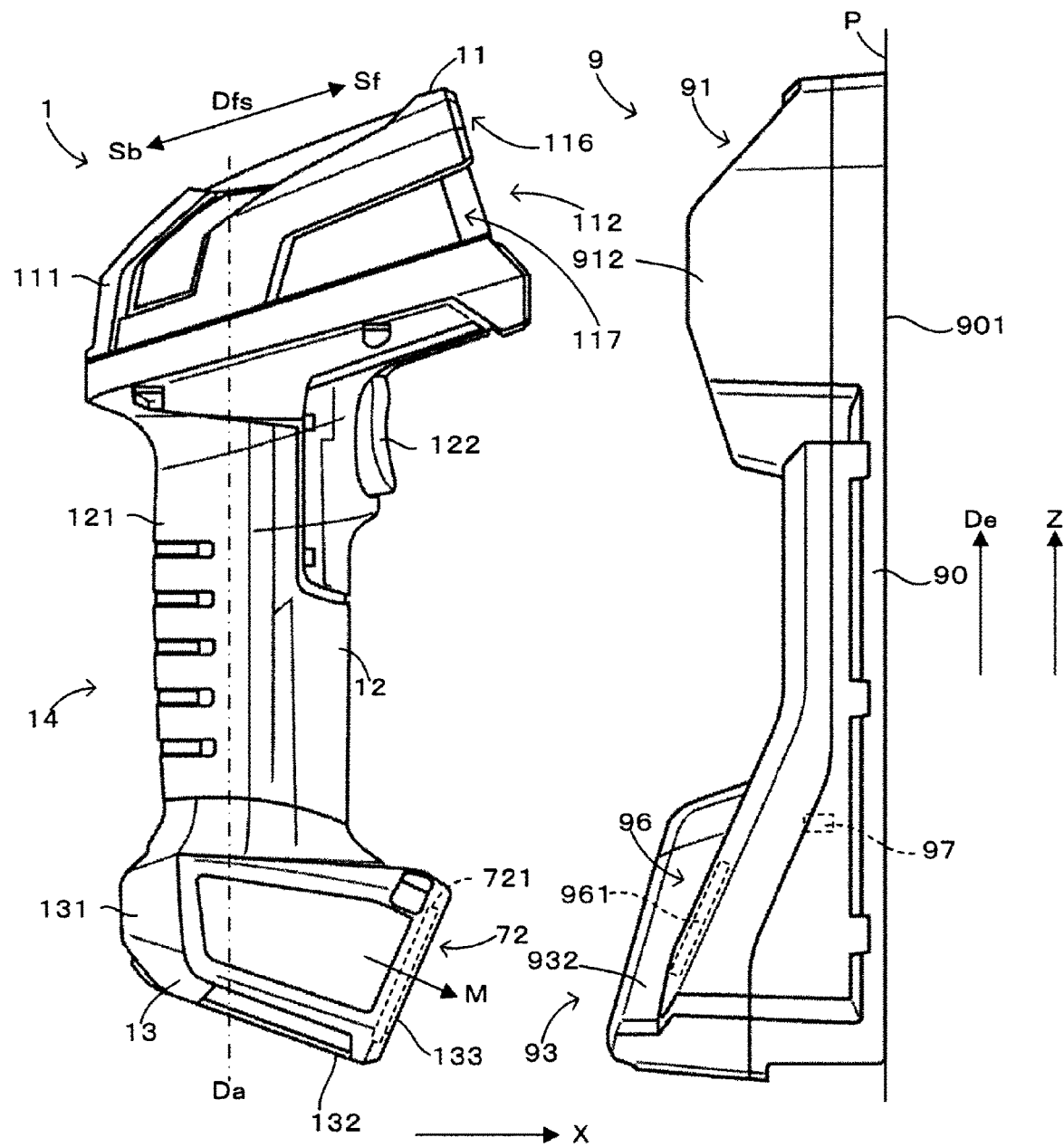
FIG. 10 is a side view illustrating the stand installed in a vertically installed form.
Figure 11:
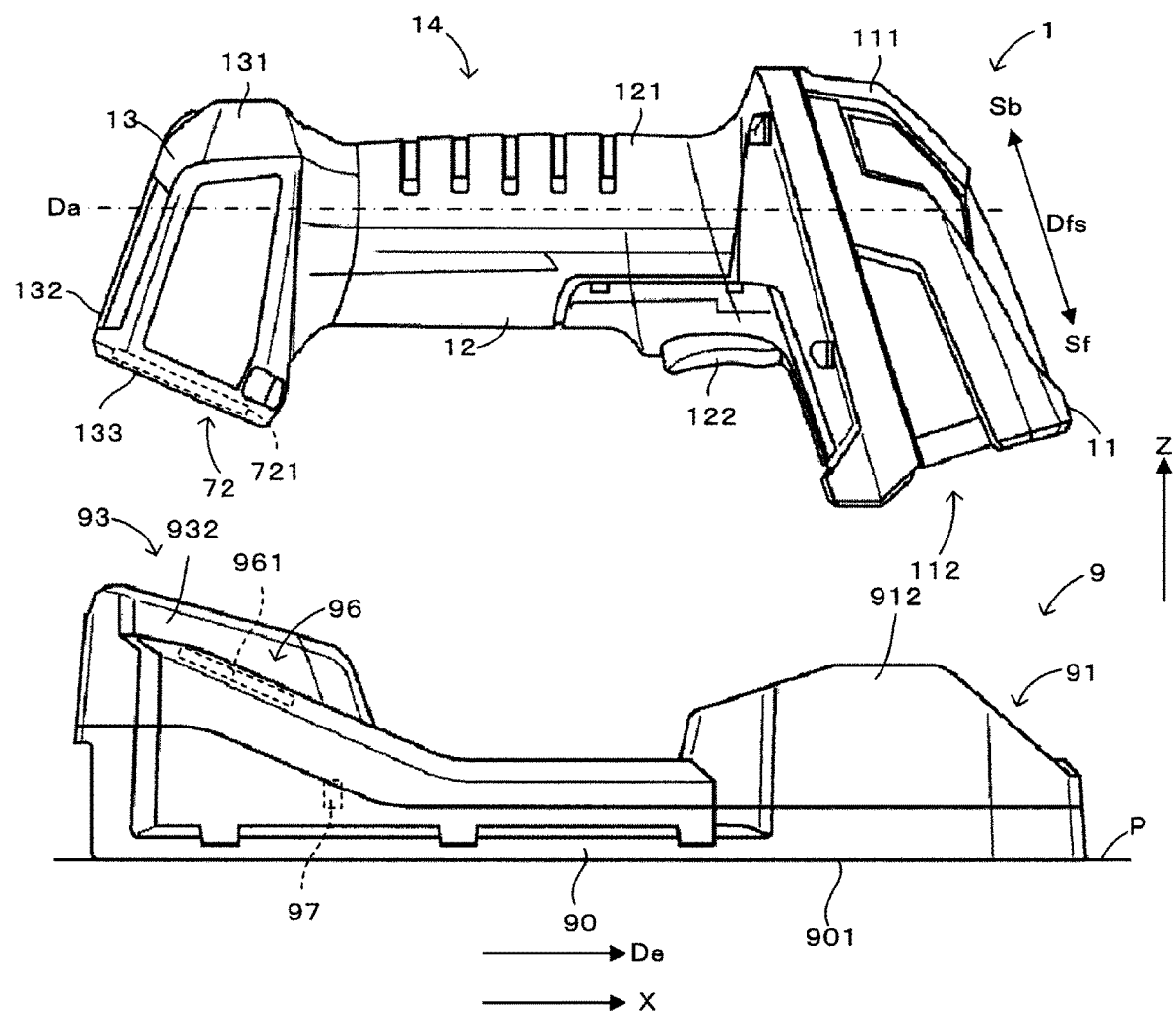
FIG. 11 is a side view illustrating the stand installed in a horizontally installed form.

The stand 9 can be used in both the vertically installed form illustrated in FIG. 10 and the horizontally installed form illustrated in FIG. 11. Here, FIG. 10 is a side view illustrating the stand installed in the vertically installed form, and FIG. 11 is a side view illustrating the stand installed in the horizontally installed form. Note that FIGS. 10 and 11 also illustrate the code reading device 1 facing the stand 9 to be placed on the stand 9.

In the vertically installed form of FIG. 10, the stand 9 is installed on the installation surface P (a vertical installation surface) parallel to a vertical direction Z (in other words, a perpendicular direction). As described above, the hook portion 19 is provided at the hook position 116 or the hook positions 117 depending on the type of the code reading device 1. On the other hand, the stand 9 is provided with the engagement member 941 and the engagement members 951 with which the hook portion 19 can be engaged.

In a first hook state in which the hook portion 19 at the hook position 116 is engaged with the engagement member 941, the code reading device 1 is supported by the engagement member 941 against the gravity in a state of being hung from the engagement member 941. That is, the hook position 116 at which the hook portion 19 is engaged with the engagement member 941 serves as a support point for supporting the code reading device 1 against the gravity. In this manner, in a state where the code reading device 1 is supported at the hook position 116, the head 11 is placed on the head placement portion 91, and the grip end 13 is placed on the grip end placement portion 93. The head 11 placed on the head placement portion 91 is positioned by the pair of wall portions 912 so as to face the head facing surface 911. In addition, the grip end 13 placed on the grip end placement portion 93 is supported by the pair of wall portions 932 so as to face the grip end facing surface 931, and the front surface 133 of the grip end 13 comes into contact with the grip end facing surface 931. In this first hook state, in the side view illustrated in FIG. 10, the center of gravity of the code reading device 1 is biased to a side opposite to the stand 9 in a horizontal direction X from the hook position 116 which is the support point of the code reading device 1. Therefore, a moment M is generated on the front surface 133 of the grip end 13 to bias the front surface 133 toward the grip end facing surface 931.

In addition, in a second hook state in which the hook portion 19 at the hook positions 117 are engaged with the engagement members 951, the code reading device 1 is supported by the engagement member 951 against the gravity in a state of being hung from the engagement member 951. That is, the hook positions 117 at which the hook portion 19 is engaged with the engagement members 951 serve as support points for supporting the code reading device 1 against the gravity. In this manner, in a state where the code reading device 1 is supported at the hook positions 117, the head 11 is placed on the head placement portion 91, and the grip end 13 is placed on the grip end placement portion 93. The head 11 placed on the head placement portion 91 is positioned by the pair of wall portions 912 so as to face the head facing surface 911. In addition, the grip end 13 placed on the grip end placement portion 93 is supported by the pair of wall portions 932 so as to face the grip end facing surface 931, and the front surface 133 of the grip end 13 comes into contact with the grip end facing surface 931. In this second hook state, in the side view illustrated in FIG. 10, the center of gravity of the code reading device 1 is biased to a side opposite to the stand 9 in a horizontal direction X from the hook positions 117 which are the support points of the code reading device 1. Therefore, a moment M is generated on the front surface 133 of the grip end 13 to bias the front surface 133 toward the grip end facing surface 931.

That is, in the first and second hook states, the front surface 133 is biased against the grip end facing surface 931 by the moment M acting on the front surface 133 of the grip end 13. As a result, reliable proximity between the power receiving unit 72 provided on the front surface 133 and the power transmitting unit 96 provided on the grip end facing surface 931 is secured. In the present specification, the proximity means being close to a degree to which charging can be started between the power receiving unit 72 and the power transmitting unit 96. In addition, the power receiving unit 72 and the power transmitting unit 96 are brought into contact with each other in the present embodiment, but the invention is not limited thereto, and for example, a gap (for example, about 5 mm) may be provided between the power receiving unit 72 and the power transmitting unit 96 to a chargeable extent by providing a projecting portion (not illustrated) on the grip end facing surface 931. As a result, power can be wirelessly supplied from the power transmitting coil 961 to the power receiving coil 721 by bringing the power receiving coil 721 and the power transmitting coil 961 close to each other.

In the horizontally installed form of FIG. 11, the stand 9 is installed on the installation surface P (a horizontal installation surface) parallel to the horizontal direction X. Further, the code reading device 1 is placed on the stand 9 from the upper side. That is, the head 11 is placed on the head placement portion 91 from the upper side and supported in the vertical direction Z against the gravity by the head placement portion 91, and the grip end 13 is placed on the grip end placement portion 93 from the upper side and supported in the vertical direction Z against the gravity by the grip end placement portion 93. In other words, the front surface 133 is pressed against the grip end facing surface 931 by the own weight of the grip end 13 acting on the front surface 133 of the grip end 13. As a result, reliable proximity between the power receiving unit 72 provided on the front surface 133 and the power transmitting unit 96 provided on the grip end facing surface 931 is secured. As a result, power can be wirelessly supplied from the power transmitting coil 961 to the power receiving coil 721 by bringing the power receiving coil 721 and the power transmitting coil 961 close to each other.

As described above, the code reading device 1 includes the finger bar 15 extending from the grip end 13 toward the head 11 on the trigger switch 122 side (the front side Sf) of the grip 12. In addition, the spaces S1 and S2 for the hand of the user grasping the grip 12 to be located are provided between the finger bar 15 and the grip 12. The finger bar 15 is provided with the attachment holes 166 for attaching the code reading device 1 to the support base provided separately from a code reading system including the code reading device 1 and the stand 9.

In addition, in a state where the code reading device 1 is placed on the stand 9 installed in the vertically installed form or the horizontally installed form, the head 11 and the grip end 13 are in contact with the head placement portion 91 and the grip end placement portion 93 of the stand 9, respectively, and the finger bar 15 is located between the grip 12 and the stand 9 and is brought into contact with or separated from the stand 9. In this manner, the head 11 or the grip end 13 is prevented from floating from the stand 9 due to interference between the finger bar 15 and the stand 9. As a result, the reliable proximity between the power receiving unit 72 provided on the front surface 133 and the power transmitting unit 96 provided on the grip end facing surface 931 is secured.

Figure 12A:
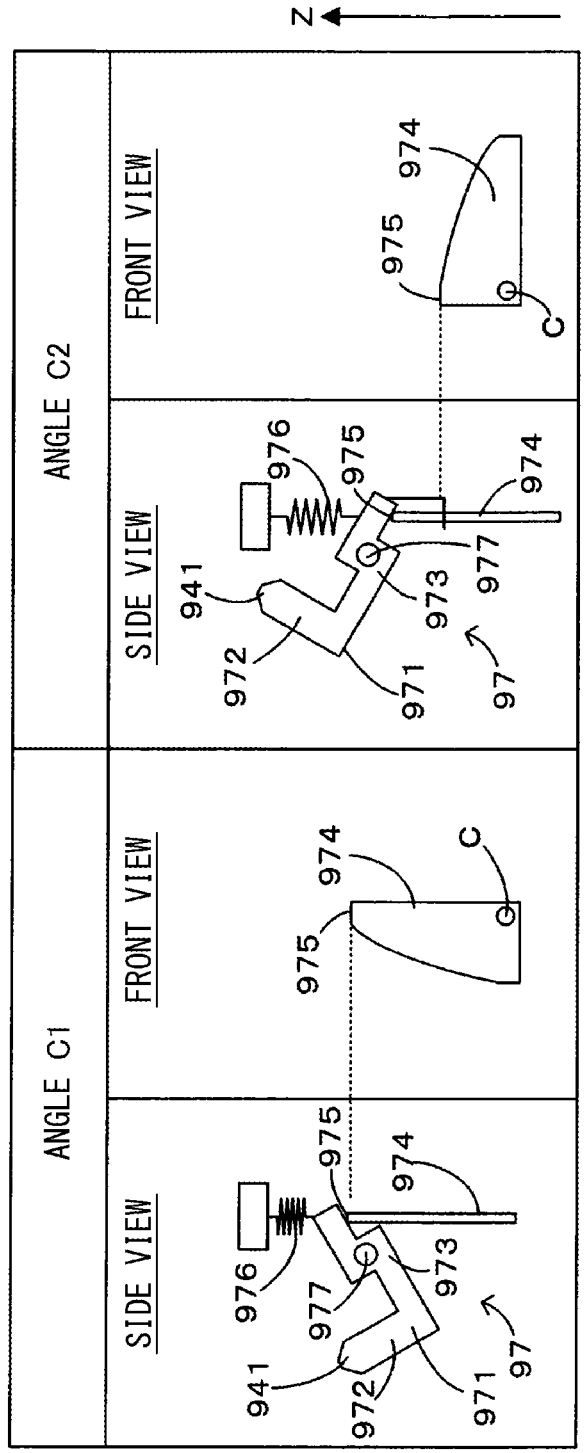
FIG. 12A is a view schematically illustrating an example of a mechanism for advancing and retracting an engagement member that supports the code reading device.
Figure 12B:
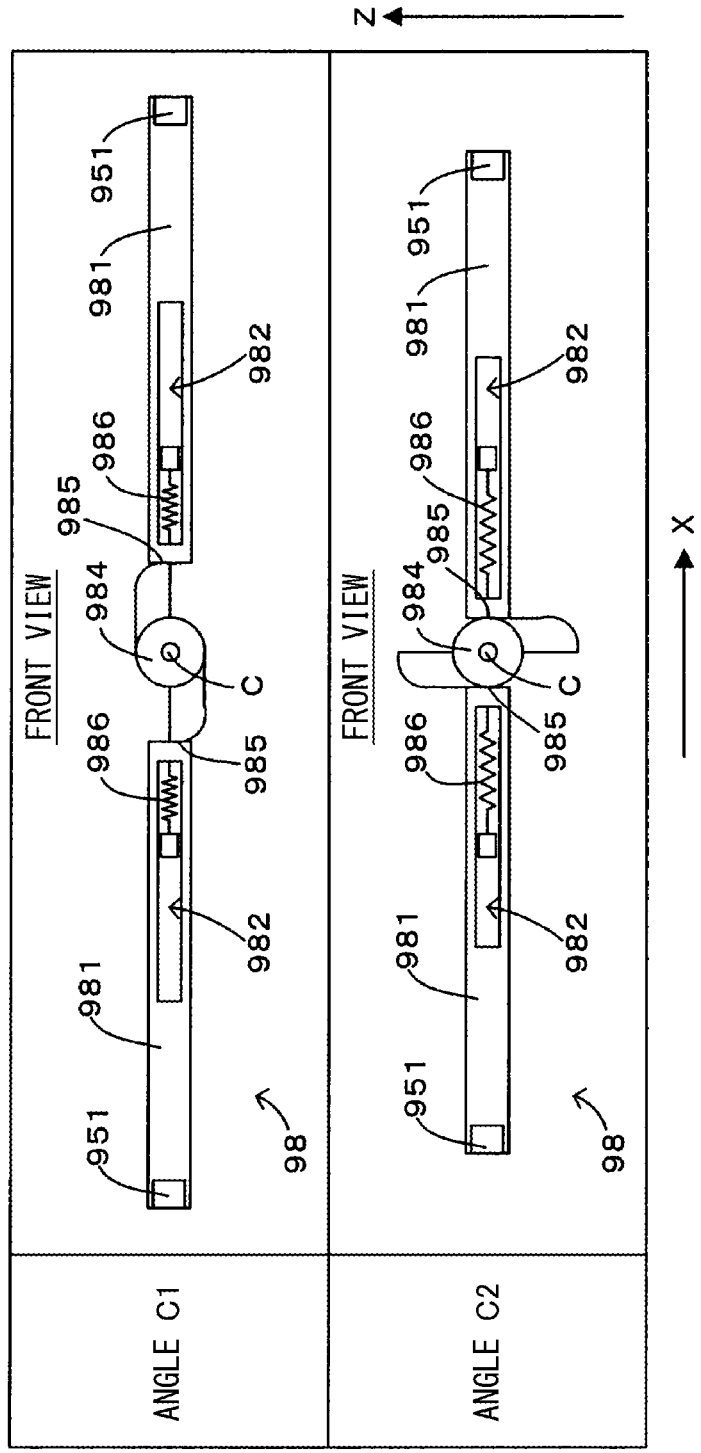
FIG. 12B is a view schematically illustrating the example of the mechanism for advancing and retracting the engagement member that supports the code reading device.
Figure 12C:
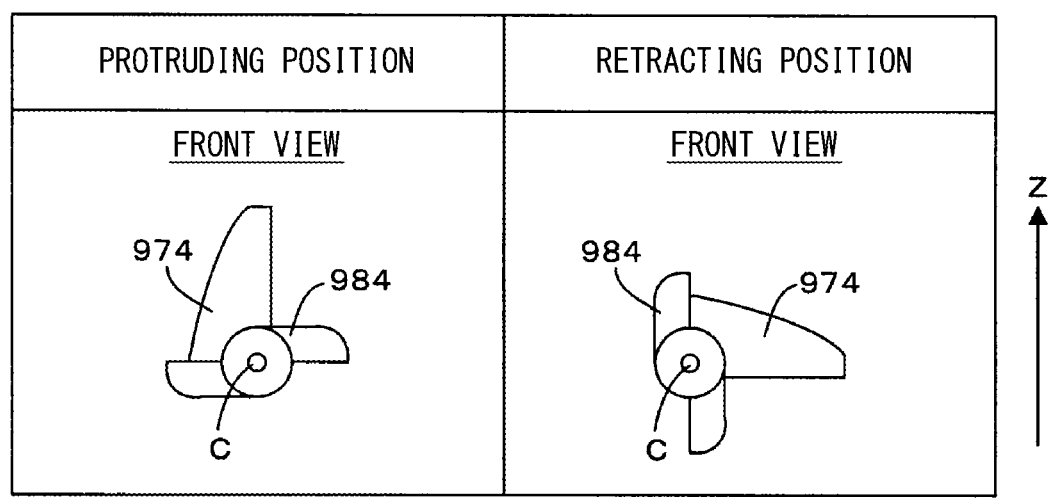
FIG. 12C is a view schematically illustrating the example of the mechanism for advancing and retracting the engagement member that supports the code reading device.

Meanwhile, the stand 9 includes the engagement member 941 for supporting the code reading device 1 and an advancing and retracting mechanism for advancing and retracting the engagement members 951. FIGS. 12A, 12B, and 12C are views schematically illustrating an example of the mechanism for advancing and retracting the engagement members supporting the code reading device. Since a scene where these engagement members 941 and 951 function to support the code reading device 1 is the vertically installed form, the description of FIGS. 12A to 12C will be made on the premise of the stand 9 installed in the vertically installed form.

FIG. 12A illustrates an advancing and retracting mechanism 97 that advances and retracts the engagement member 941 in the vertical direction Z with respect to the block body 942. The advancing and retracting mechanism 97 is housed in the head placement portion 91. As illustrated in a field of "side view" in FIG. 12A, the advancing and retracting mechanism 97 includes an advancing and retracting member 971. The advancing and retracting member 971 includes an erect portion 972 erected in the vertical direction Z and a support portion 973 supporting the erect portion 972 from the lateral side, and the engagement member 941 is provided at an upper end of the erect portion 972. In addition, the advancing and retracting mechanism 97 includes an eccentric cam 974 that supports the advancing and retracting member 971 from the lower side. As illustrated in a field of "front view" in FIG. 12A, the eccentric cam 974 is rotatable about a rotation center C by 90 degrees, and comes into contact with the support portion 973 of the advancing and retracting member 971 from the lower side at a peripheral surface 975 whose distance from the rotation center C changes according to a rotation angle about the rotation center C. In addition, the advancing and retracting mechanism 97 includes a compression spring 976 that biases the support portion 973 from a side opposite to (the upper side of) the eccentric cam 974 to the eccentric cam 974 side (the lower side).

In such a configuration, when the rotation angle of the eccentric cam 974 is an angle C1, the eccentric cam 974 pushes up the engagement member 941 in the upward direction in the drawing against a biasing force of the compression spring 976, and rotates the engagement member 941 about a rotation axis 977, so that the engagement member 941 is located at a retracted position of being retracted into the support block 94. In addition, when the rotation angle of the eccentric cam 974 is an angle C2, the engagement member 941 is pushed down in the downward direction in the drawing by the biasing force of the compression spring 976, and rotates the engagement member 941 about the rotation axis 977, so that the engagement member 941 is located at an advanced position protruding upward from the inside of the support block 94. At the protruding position, when the engagement member 941 is pushed by an external force, the spring 976 is compressed, so that the movement is possible up to the retracted position. Therefore, the code reading device 1 can be detached from or attached to the stand 9.

FIG. 12B illustrates an advancing and retracting mechanism 98 that advances and retracts the pair of engagement members 951 in the horizontal direction X with respect to the pair of wall portions 912. The advancing and retracting mechanism 98 is housed in the head placement portion 91. As illustrated in FIG. 12B, the advancing and retracting mechanism 98 includes a pair of advancing and retracting members 981 arranged at an interval in the horizontal direction X. The advancing and retracting members 981 extend in the horizontal direction X, and the engagement members 951 are attached inwardly to outer ends of the pair of advancing and retracting members 981, respectively. In addition, the advancing and retracting member 981 is formed with a spring housing slit 982 extending in the horizontal direction X. In addition, the advancing and retracting mechanism 98 includes an eccentric cam 984 provided between the pair of advancing and retracting members 981 in the horizontal direction X. As illustrated in FIG. 12 C, the eccentric cam 984 is provided coaxially with the eccentric cam 974, and is rotatable about the rotation center C common to the eccentric cam 974. In addition, a rotating lever coaxially attached to the eccentric cams 974 and 984 is provided on a back surface (a surface on a side opposite to the head facing surface 911) of the base portion 90, and the eccentric cams 974 and 984 integrally rotate together with the rotating lever when the user rotates the rotating lever. The eccentric cam 984 is in contact with an inner end of each of the pair of advancing and retracting members 981 on a peripheral surface 985 whose distance from the rotation center C changes according to a rotation angle about the rotation center C. In addition, the advancing and retracting mechanism 98 includes a compression spring 986 arranged in the spring housing slit 982 provided in the advancing and retracting member 981, and the compression spring 986 biases the advancing and retracting member 981 from a side opposite to the eccentric cam 984 to the eccentric cam 984 side. The compression spring 986 is provided for each of the pair of advancing and retracting members 981.

In such a configuration, when the rotation angle of the eccentric cam 984 is the angle C1, the eccentric cam 984 presses the engagement members 951 outward against a biasing force of the compression spring 986, and the engagement members 951 is located at a retracted position to be retracted into the wall portion 912. In addition, when the rotation angle of the eccentric cam 984 is the angle C2, the advancing and retracting member 981 is pressed inward by the biasing force of the compression spring 986, and the engagement members 951 are located at advanced positions protruding inward from the wall portion 912. In the advanced positions, when the engagement members 951 are pushed by an external force, the spring is compressed, so that the movement is possible up to the retracted position. Therefore, the code reading device 1 can be detached from or attached to the stand 9.

FIG. 13 is a block diagram illustrating a configuration of the power supply unit of the code reading device. The power supply unit 7 includes a charging IC 73, and the charging IC 73 executes control to store power received by the power receiving unit 72 from the power transmitting unit 96 in the battery 71 and supply the power stored in the battery 71 to each unit of the code reading device 1. Furthermore, the power supply unit 7 includes a load switch 74, a main power supply 75, and a power saving mode management circuit 76. The power saving mode management circuit 76 turns on and off the load switch 74 in response to an instruction from the controller 4 (CPU). In a state where the power saving mode management circuit 76 turns on the load switch 74, the charging IC 73 supplies power extracted from the battery 71 to the main power supply 75 via the load switch 74. In addition, in a state where the power saving mode management circuit 76 turns off the load switch 74, the supply of power from the charging IC 73 to the main power supply 75 is cut off.

The main power supply 75 supplies the power supplied from the charging IC 73 to the illumination unit 2, the imaging unit 3, and the controller 4, and the illumination unit 2, the imaging unit 3, and the controller 4 can operate with this power. In addition, the power supply unit 7 may include a super capacitor (SCAP) 77. For example, the resistance of the battery 71 increases when the code reading device is used in a low temperature environment, and thus, the SCAP 77 is used as an assist power supply in a case where a large current is temporarily required. In this case, the battery 71 and the SCAP 77 constitute a power storage unit. In addition, only the SCAP 77 may be provided instead of the battery 71 as another embodiment. In this case, the SCAP 77 constitutes the power storage unit. Since the power supplied from the charging IC 73 to the main power supply 75 is limited, if there is surplus power at the time of charging, the surplus power is stored in the SCAP 77. In the present embodiment, since the power from the charging IC 73 is stored in the SCAP 77, the SCAP 77 can be similarly used in applications where power to be supplied is limited, such as USB power feeding.

In addition, the power supply unit 7 includes a charging LED 78, and a lighting mode of the charging LED 78 is controlled by the charging IC 73 according to a charging status of the battery 71. For example, the charging IC 73 lights the charging LED 78 in green when charging of the battery 71 is completed, and the charging IC 73 lights the charging LED 78 in red when charging of the battery 71 is not completed.

Furthermore, the power supply unit 7 includes a continuous power supply 79. The charging IC 73 supplies the power extracted from the battery 71 to the continuous power supply 79. In addition, the continuous power supply 79 supplies the power supplied from the charging IC 73 to the power saving mode management circuit 76, the charging LED 78, the trigger switch 122, and the display SP, and the power saving mode management circuit 76, the charging LED 78, the trigger switch 122, and the display SP can operate with this power.

In such a configuration, when the power saving mode management circuit 76 turns off the load switch 74, the supply of power to the main power supply 75 is cut off, and the operations of the illumination unit 2, the imaging unit 3, and the controller 4 are stopped (a power saving mode). On the other hand, since the supply of power from the charging IC 73 to the continuous power supply 79 is executed also in the power saving mode, the power saving mode management circuit 76, the charging LED 78, the trigger switch 122, and the display SP can execute operations. Then, when sensing that the trigger switch 122 or the display SP is operated by the user, the power saving mode management circuit 76 turns on the load switch 74 and starts supplying power to the main power supply 75. That is, when sensing an operation on a user operation unit (the trigger switch 122 or the display SP) that can be operated by the user, the power saving mode management circuit 76 stops the power saving mode and starts supplying power to the main power supply 75. Note that specific user operation units are not limited to this example, and can be changed as appropriate.

Figure 14:
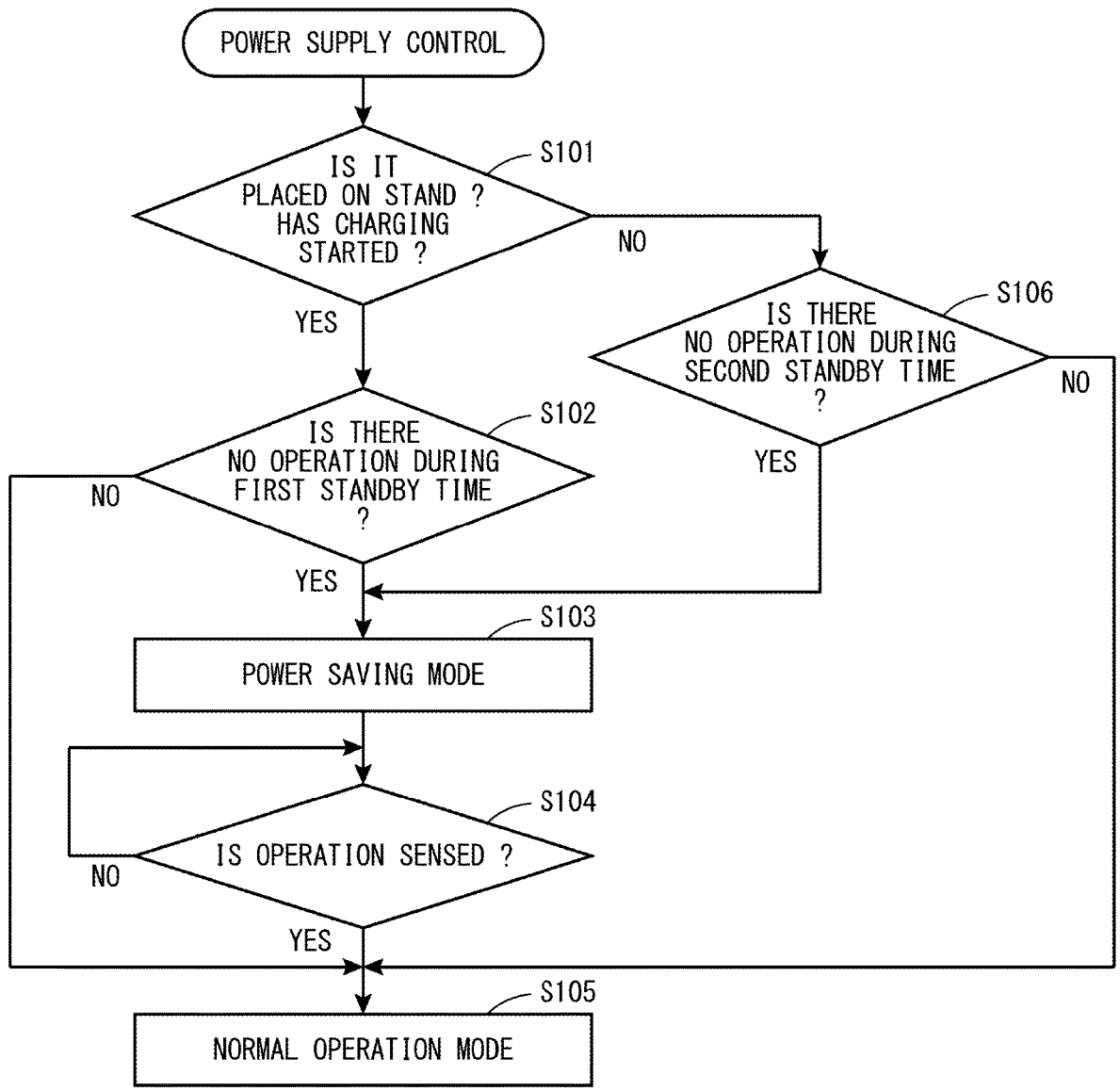
FIG. 14 is a flowchart illustrating an example of power supply control executed by the code reading device.

FIG. 14 is a flowchart illustrating an example of power supply control executed by the code reading device. In Step S101, the charging IC 73 determines whether the code reading device 1 is placed on the stand 9 based on whether or not power is supplied to the power receiving unit 72. When it is determined that the code reading device 1 is placed on the stand 9 ("YES" in Step S101), the controller 4 determines whether or not a user operation on the trigger switch 122 and the display SP has been continued for a first standby time (for example, 10 minutes) (Step S102).

When the trigger switch 122 and the display SP are operated during the first standby time ("NO" in Step S102), the processing proceeds to a normal operation mode in Step S105. On the other hand, when the trigger switch 122 and the display SP are not operated during the first standby time ("YES" in Step S102), the power saving mode is executed (Step S103). That is, the controller 4 transmits a power saving mode execution instruction to the power saving mode management circuit 76, and the power saving mode management circuit 76 receives this instruction and turns off the load switch 74. Further, when sensing an operation on the trigger switch 122 or the display SP ("YES" in Step S104), the power saving mode management circuit 76 turns on the load switch 74 and supplies power to the main power supply 75 (Step S105: the normal operation mode).

In addition, when it is determined in Step S101 that the code reading device 1 is not placed on the stand 9 ("NO" in Step S101), the controller 4 determines whether or not the user operation on the trigger switch 122 and the display SP has been continued for a second standby time (for example, 90 minutes) longer than the first standby time (Step S106). When the trigger switch 122 and the display SP are operated during the second standby time ("NO" in Step S106), the processing proceeds to Step S105. On the other hand, when the trigger switch 122 and the display SP are not operated during the second standby time ("YES" in Step S106), the power saving mode is executed (Step S103).

According to this control, when the code reading device 1 is not placed on the stand 9, there is a high possibility that the code reading device 1 is in use, so that it is possible to prevent the code reading device 1 from frequently transitioning to the power saving mode. In addition, when the code reading device 1 is placed on the stand 9, the code reading device 1 can be quickly transitioned to the power saving mode, and the time required for charging the battery 71 can be shortened.

In the embodiment configured as described above, the power receiving unit 72 incorporating the power receiving coil 721 is provided not on the head 11 but on the front surface 133 (a grip end front surface) of the grip end 13 so that an increase in size of the head 11 due to the provision of the power receiving coil 721 is avoided. In addition, in the horizontally installed form (a first form) in which the code reading device 1 is placed on the stand 9 installed on the horizontal installation surface P (a horizontal plane), the head 11 and the power receiving unit 72 are supported by the stand 9 in the vertical direction. That is, the code reading device 1 can be stably supported by the stand 9 by being supported at two positions of the head 11 and the power receiving unit 72. In addition, the power receiving unit 72 comes close to the power transmitting unit 96 of the stand 9 from the upper side while being supported by the stand 9 in this manner, so that wireless charging can be executed. As a result, it is possible to suppress the size of the head 11 of the code reading device 1 including the power receiving coil 721 for the wireless charging and to execute the wireless charging on the code reading device 1 while stably supporting the code reading device 1.

In addition, the provision of the power receiving unit 72 on the front surface 133 of the grip end 13 has the following advantages. That is, a configuration in which the power receiving unit 72 is provided on the bottom surface 132 is also assumable. However, in such a configuration, a wall portion provided on the stand 9 for supporting the power transmitting coil 961 so as to face the bottom surface 132 becomes large, and there is a possibility that the large wall portion interferes with the grip end 13 when the grip end 13 is placed on the grip end placement portion 93. On the other hand, when the power receiving unit 72 is provided on the front surface 133 of the grip end 13, it is not necessary to provide such a large wall portion, and the grip end 13 can be easily placed on the grip end placement portion 93.

In addition, the stand 9 can be mounted on the vertical installation surface P (a vertical plane), and includes the head placement portion 91 on which the head 11 is mounted. In addition, the head 11 includes the hook portion 19 (a first fitting portion) provided at an end portion of the light receiving element 31 on a detection region side (on the front side Sf which means a visual field side of a camera in a case where the light receiving element 31 constitutes the camera). In addition, the head placement portion 91 includes the engagement members 941 and 951 (second fitting portions) to be fitted to the hook portions 19 in a state where the code reading device 1 is placed on the stand 9. Further, in the vertically installed form (a second form) in which the code reading device 1 is placed on the stand 9 installed on the vertical installation surface P, the power receiving unit 72 is biased in a direction toward the power transmitting unit 96 by the moment M starting from the hook portion 19 fitted in the engagement member 941 (or 951), the power receiving unit 72 comes into contact with the power transmitting unit 96, the power receiving coil 721 faces the power transmitting coil 961, and the wireless charging is executed from the power transmitting coil 961 to the battery 71 via the power receiving coil 721. In such a configuration, when the code reading device 1 is hooked on the stand 9 installed on the vertical installation surface P, the moment M biasing the power receiving unit 72 in the direction toward the power transmitting unit 96 is generated. Therefore, it is possible to reliably bring the power transmitting unit 96 and the power receiving unit 72 into contact with each other and execute wireless charging of the code reading device 1 only by performing simple work such as hooking the code reading device 1 on the stand 9.

In addition, the stand 9 includes the head placement portion 91 for placement of the head 11, and the head placement portion 91 includes the wall portion 912 for positioning the head 11 placed on the head placement portion 91. Further, in a state where the stand 9 is installed on the vertical installation surface P, the wall portion 912 is provided at a position retracted from the entry path Q through which the head 11 enters the head placement portion 91 when the head 11 is placed on the head placement portion 91 of the stand 9 in the vertical direction Z from the upper side. With such a configuration, the head 11 can be easily placed on the head placement portion 91 without being hindered by the wall portion 912.

In addition, the stand 9 has the grip end placement portion 93 for placement of the grip end 13, and the grip end placement portion 93 has the grip end facing surface 931 (an inclined surface) which is inclined with respect to the installation surface P when the stand 9 is installed on the horizontal installation surface P, and is inclined with respect to the installation surface P every time the stand 9 is installed on the vertical installation surface P. The power transmitting unit 96 is provided on the grip end facing surface 931 inclined as described above. In such a configuration, even when foreign matter adheres to the power transmitting unit 96, the foreign matter can be dropped along the inclination of the grip end facing surface 931 provided with the power transmitting unit 96. As a result, it is possible to prevent the wireless charging from being affected by the foreign matter.

Specifically, the stand 9 includes the head placement portion 91 for placement of the head 11. On the other hand, the grip end facing surface 931 is inclined in a direction away from the installation surface P on which the stand 9 is installed as the distance from the head placement portion 91 increases in the side view. Since the grip end facing surface 931 is inclined as described above, the foreign matter adhering to the power transmitting unit 96 can be naturally dropped by gravity.

In addition, the grip end placement portion 93 includes the wall portion 932 for positioning the grip end 13 mounted on the grip end placement portion 93, and the wall portion 932 is provided with the slit 933 (hole) opened in a direction in which the grip end facing surface 931 is inclined. Since the slit 933 is provided as described above, the foreign matter can be naturally dropped from the power transmitting unit 96 by gravity via the slit 933.

In addition, the code reading device 1 includes the finger bar 15 extending from the grip end 13 toward the head 11 on the trigger switch 122 side (the front side Sf) of the grip 12, and the spaces S1 and S2 for the hand of the user grasping the grip 12 to be located are provided between the finger bar 15 and the grip 12. The finger bar 15 is provided with the attachment hole 166 for attachment to the support base (a support portion) provided separately from the code reading system including the code reading device 1 and the stand 9. Further, in a state in which the code reading device 1 is placed on the stand 9, the head 11 and the grip end 13 comes into contact with the head placement portion 91 and the grip end placement portion 93 of the stand 9, respectively, and the finger bar 15 is located between the grip 12 and the stand 9 and comes into contact with the stand 9 or is separated from the stand 9. In such a configuration, the code reading device 1 can be placed on the stand 9 without being hindered by the finger bar 15.

In addition, the code reading device 1 includes the controller 4 (a processor) for controlling the light receiving sensor 31, the charging IC 73 (a sensing circuit) for sensing the start of wireless charging of the battery 71, and the power saving mode management circuit 76 (a control circuit) for supplying the power transmitted from the power receiving coil 721 to the controller 4. Further, when the charging IC 73 senses the start of wireless power feeding to the battery 71 ("YES" in Step S101), the power saving mode management circuit 76 (control circuit) reduces the amount of power to be supplied to the controller 4 (Step S103). In such a configuration, when the code reading device 1 is placed on the stand 9 and the wireless power feeding is started, the power feeding to the controller 4 is cut off, wasteful power consumption is suppressed, so that the time required for charging can be shortened. Note that in the power saving mode 103, the power consumption of the controller 4 may be reduced by causing the controller 4 to transition to an idle state instead of cutting off the power feeding to the controller 4.

In addition, even when the charging IC 73 senses the start of wireless charging of the battery 71, the power saving mode management circuit 76 continues the supply of power to the trigger switch 122 by the continuous power supply 79. Further, when the trigger switch 122 is activated (that is, operated), the controller 4 releases the power saving mode to enable the control of the light receiving sensor 31 (Steps S104 and S105). In such a configuration, an energy saving mode can be easily switched to the normal operation mode by operating the trigger switch 122.

As described above, in the present embodiment, the code reading device 1 corresponds to an example of a "code reading device" of the invention, the stand 9 corresponds to an example of a "stand" of the invention, the code reading device 1 and the stand 9 correspond to an example of a "code reading system" of the invention, the power transmitting coil 961 corresponds to an example of a "power transmitting coil" of the invention, the power transmitting unit 96 corresponds to an example of a "power transmitting unit" of the invention, the light receiving sensor 31 corresponds to an example of a "light receiving sensor" of the invention, the head 11 corresponds to an example of a "head" of the invention, the grip 12 corresponds to an example of a "grip" of the invention, the grip end 13 corresponds to an example of a "grip end" of the invention, the battery 71 corresponds to an example of a "battery" of the invention, the trigger switch 122 corresponds to an example of a "trigger switch" of the invention, the bottom surface 132 corresponds to an example of a "grip end bottom surface" of the invention, the front surface 133 corresponds to an example of a "grip end front surface" of the invention, the power receiving coil 721 corresponds to an example of a "power receiving coil" of the invention, the power receiving unit 72 corresponds to an example of a "power receiving unit" of the invention, the head placement portion 91 corresponds to an example of a "head placement portion" of the invention, the hook portion 19 corresponds to an example of a "first fitting portion" of the invention, the engagement member 941 or the engagement member 951 corresponds to an example of a "second fitting portion" of the invention, the wall portion 912 corresponds to an example of a "wall portion" of the invention, the grip end placement portion 93 corresponds to an example of a "grip end placement portion" of the invention, the grip end facing surface 931 corresponds to an example of an "inclined surface" of the invention, the wall portion 932 corresponds to an example of a "wall portion" of the invention, the slit 933 corresponds to an example of a "hole" of the invention, the finger bar 15 corresponds to an example of a "plate-shaped member" of the invention, the attachment hole 166 corresponds to an example of an "attachment hole" of the invention, the controller 4 corresponds to an example of a "processor" of the invention, the charging IC 73 corresponds to an example of a "sensing circuit" of the invention, and the power saving mode management circuit 76 corresponds to an example of a "control circuit" of the invention.

Note that the invention is not limited to the above-described embodiment and various modifications can be made to those described above without departing from the gist thereof. For example, the finger bar 15 does not need to extend from the grip end 13 to the head 11, and the finger bar 15 may be provided only in a range from the grip end 13 to a halfway position (the middle portion 165).

The invention is applicable to all techniques for executing wireless charging on a code reading device.

What is claimed is:

1. A charging stand for charging a plurality of types of code reading devices, each of which includes a power receiving coil and a power storage unit, the charging stand comprising:
    a base portion that extends along a first direction and is installable on a vertical plane;
    a head placement portion that is provided at one end of the base portion in the first direction, on which a head of the code reading device is to be placed, and on which a first projection and a second projection are formed;
    a grip end placement portion that is provided at the other end of the base portion in the first direction, on which a grip end of the code reading device is to be placed and in which a power transmitting coil is built in; and
    a mechanism configured to advance and retract the first projection and the second projection into and out of the head placement portion;
    wherein, in a state in which the base portion is installed on the vertical plane such that the first direction is vertical and the head placement portion is located uppermost, one of the first projection and the second projection engages with a hook portion of the code reading device, in accordance with the type of the code reading device, thereby holding the code reading device in the vertical direction;
    in a state in which the base portion is installed on a horizontal plane and both the first projection and the second projection are retracted inside the head placement portion, any of the plurality of types of code reading devices is placed on the stand with its hook portion engaging neither of the first and second projections; and
    the power transmitting coil performs wireless power supply, via the power receiving coil in the grip end of the code reading device, while any one of the plurality of types of code reading devices is being held on the first projection or the second projection.

2. The charging stand according to claim 1,
    wherein, in a state in which the base portion is installed on the vertical plane such that the first direction is vertical and the head placement portion is located uppermost:
    the first projection is provided at a horizontal center of the head placement portion, and a corresponding code reading device is held vertically by being hung on the first projection; and
    the second projection is provided, as a pair of projections, on both horizontal sides of the head placement portion, and a corresponding code reading device is held vertically by being clamped between the paired of projections of the second projections.

3. The charging stand according to claim 2,
    wherein the head placement portion includes a wall portion for positioning the head of the code reading device,
    the wall portion is disposed at a position retracted from a path along which the head enters the head placement portion when the head is placed thereon from above in the vertical direction while the base portion is installed on the vertical plane with the head placement portion uppermost, and
    the second projection is provided on the wall portion.

4. The charging stand according to claim 1,
    wherein the power transmitting coil is arranged substantially parallel to an upper surface of the grip end placement portion.

5. The charging stand according to claim 4,
wherein the upper surface of the grip end placement portion is inclined with respect to a contact surface of the base portion that is used for installation.

6. The charging stand according to claim 5,
wherein, in a side view, the upper surface is inclined away from the contact surface as a distance from the head placement portion increases.

7. The charging stand according to claim 5,
wherein the grip end placement portion includes a wall portion for positioning the grip end of the code reading device placed thereon, and
the wall portion is provided with a hole that opens in a direction in which the upper surface is inclined.

8. A code reading system comprising:
a plurality of types of code reading devices and a charging stand including a power transmitting coil, wherein
each of the plurality of types of code reading devices includes:
  a head incorporating a light receiving sensor;
  a grip extending from the head in an axial direction;
  a grip end provided at an end portion of the grip on a side opposite to the head in the axial direction; and
  a power storage unit,
each grip of the plurality of types of code reading devices includes a trigger switch provided between the head and the grip end on a detection region side of the light receiving sensor,
each grip end of the plurality of types of code reading devices includes:
  a grip end bottom surface intersecting the axial direction;
  a grip end front surface extending from the grip end bottom surface toward the trigger switch; and
  a power receiving unit that incorporates a power receiving coil and is provided on the grip end front surface;
the charging stand includes:
  a base portion that extends along a first direction and is installable on a vertical plane;
  a head placement portion with a first projection and a second projection; and
  a grip end placement portion with the power transmitting coil,
in a state in which the base portion is installed on the vertical plane such that the first direction is vertical and the head placement portion is located uppermost, one of the first projection and the second projection engages with a hook portion of the code reading device different in position in accordance with the type of the code reading device, thereby holding the code reading device in the vertical direction;
the power transmitting coil performs wireless power supply, via the power receiving coil in the grip end of the code reading device, while any one of the plurality of types of code reading devices is being held on the first projection or the second projection;
the charging stand further includes a mechanism configured to advance and retract the first projection and the second projection, and,
in a state in which the base portion is installed on a horizontal plane and both the first projection and the second projection are retracted inside the head placement portion, any of the plurality of types of code reading devices is placed on the stand with its hook portion engaging neither of the first and second projections.

9. The code reading system according to claim 8,
wherein, in a state in which the base portion is installed on the vertical plane such that the first direction is vertical and the head placement portion is located uppermost,
the first projection is provided at a horizontal center of the head placement portion, and a corresponding code reading device is held vertically by being hung on the first projection; and
the second projection is provided, as a pair of projections, on both horizontal sides of the head placement portion, and a corresponding code reading device is held vertically by being clamped between the paired projections of the second projection.

10. The code reading system according to claim 9,
wherein the head placement portion includes a wall portion for positioning the head of the code reading device,
the wall portion is disposed at a position retracted from a path along which the head enters the head placement portion when the head is placed thereon from above in the vertical direction while the base portion is installed on the vertical plane with the head placement portion uppermost, and
the second projection is provided on the wall portion.

11. The code reading system according to claim 8,
wherein the power transmitting coil is arranged substantially parallel to an upper surface of the grip end placement portion.

12. The code reading system according to claim 11,
wherein the upper surface of the grip end placement portion is inclined with respect to a contact surface of the base portion that is used for installation.

13. The code reading system according to claim 12,
wherein, in a side view, the upper surface is inclined away from the contact surface as a distance from the head placement portion increases.

14. The code reading system according to claim 12,
wherein the grip end placement portion includes a wall portion for positioning the grip end of the code reading device placed thereon, and
the wall portion is provided with a hole that opens in a direction in which the upper surface is inclined.

* * * * *